(12) United States Patent
Sekizawa et al.

(10) Patent No.: US 8,975,567 B2
(45) Date of Patent: Mar. 10, 2015

(54) COORDINATE DETECTOR

(71) Applicant: Fujitsu Component Limited, Tokyo (JP)

(72) Inventors: Mitsuhiro Sekizawa, Tokyo (JP); Osamu Daikuhara, Tokyo (JP); Satoshi Moriyama, Tokyo (JP); Ayumu Akabane, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 88 days.

(21) Appl. No.: 13/975,442

(22) Filed: Aug. 26, 2013

(65) Prior Publication Data

US 2014/0061432 A1 Mar. 6, 2014

(30) Foreign Application Priority Data

Aug. 28, 2012 (JP) ................................. 2012-188054

(51) Int. Cl.
*G06F 3/042* (2006.01)

(52) U.S. Cl.
CPC ................................... *G06F 3/0421* (2013.01)
USPC ....................................... 250/206.1; 345/175

(58) Field of Classification Search
USPC ........................................ 250/206.1; 345/175
See application file for complete search history.

(56) References Cited

U.S. PATENT DOCUMENTS

| 2011/0157097 A1* | 6/2011 | Hamada et al. | 345/175 |
| 2012/0038591 A1* | 2/2012 | Chen et al. | 345/175 |
| 2012/0249484 A1* | 10/2012 | Hata et al. | 345/175 |

FOREIGN PATENT DOCUMENTS

JP 2009-199259 9/2009

* cited by examiner

*Primary Examiner* — Seung C Sohn
(74) *Attorney, Agent, or Firm* — IPUSA, PLLC

(57) ABSTRACT

A coordinate detector includes a light output part, a light detection part, a first guide part, and a second guide part. The light output part emits light. The light detection part outputs a detection signal according to the amount of entering light. The light output part and the light detection part are provided in an area around a display part on a side closer to a first surface of the display part than to its second surface facing away from the first surface. The first guide part guides light emitted from the light output part toward a direction along the first surface. The second guide part guides, toward the light detection part, light exiting from the first guide part and passing over the first surface.

10 Claims, 19 Drawing Sheets

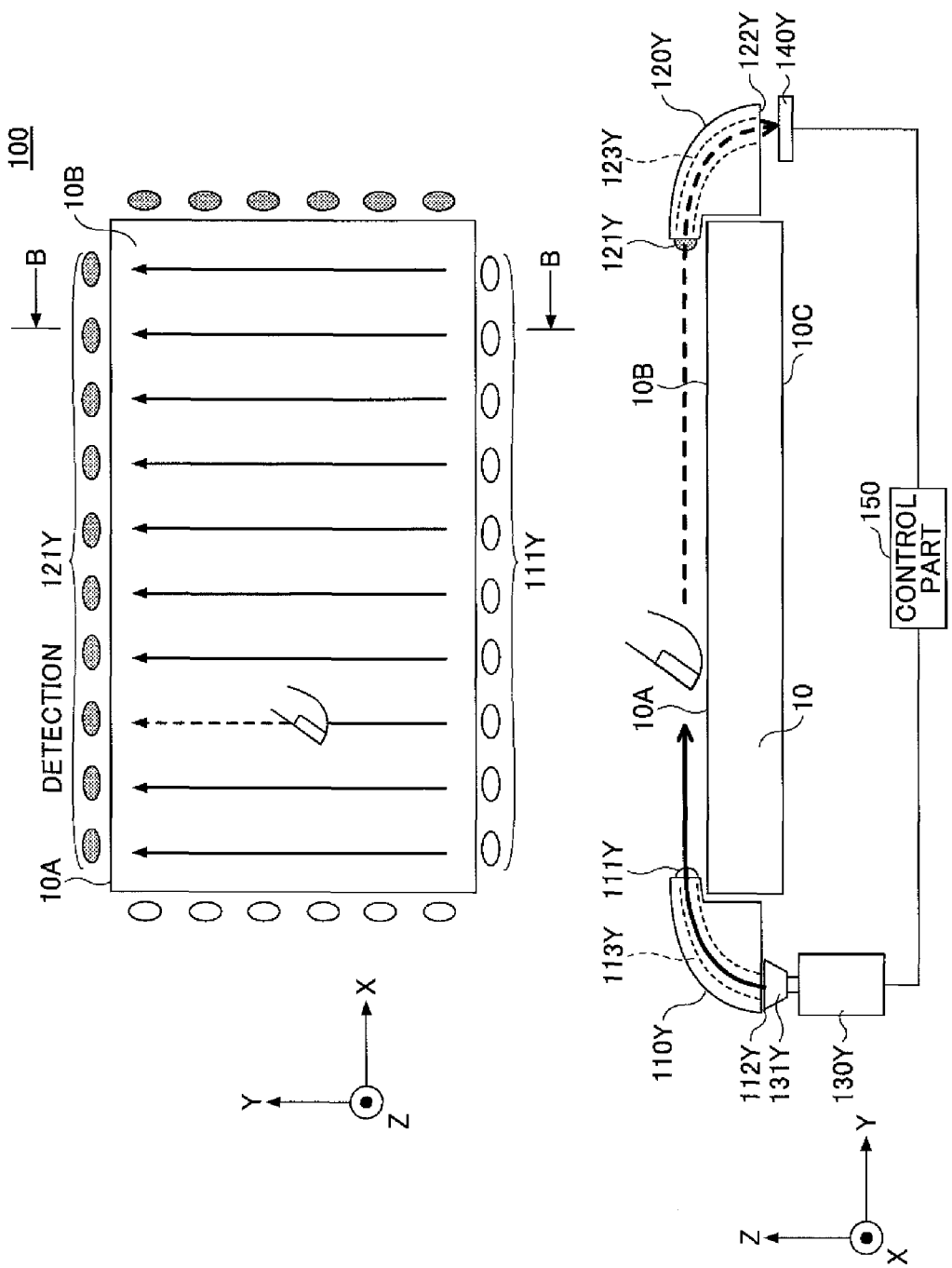

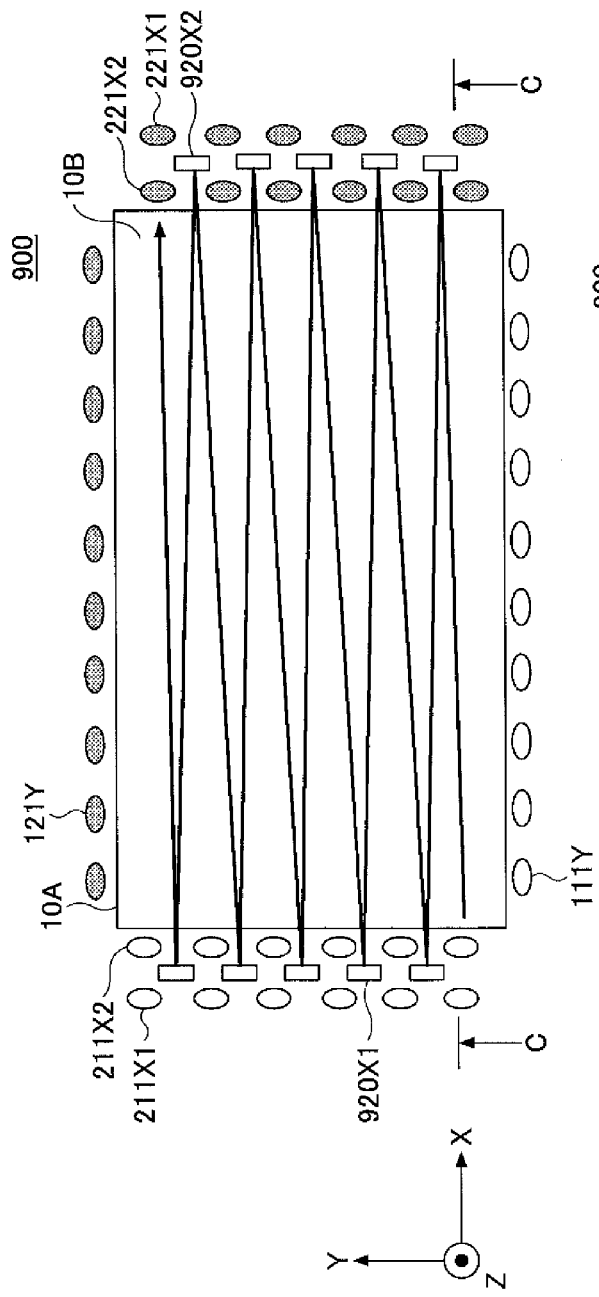
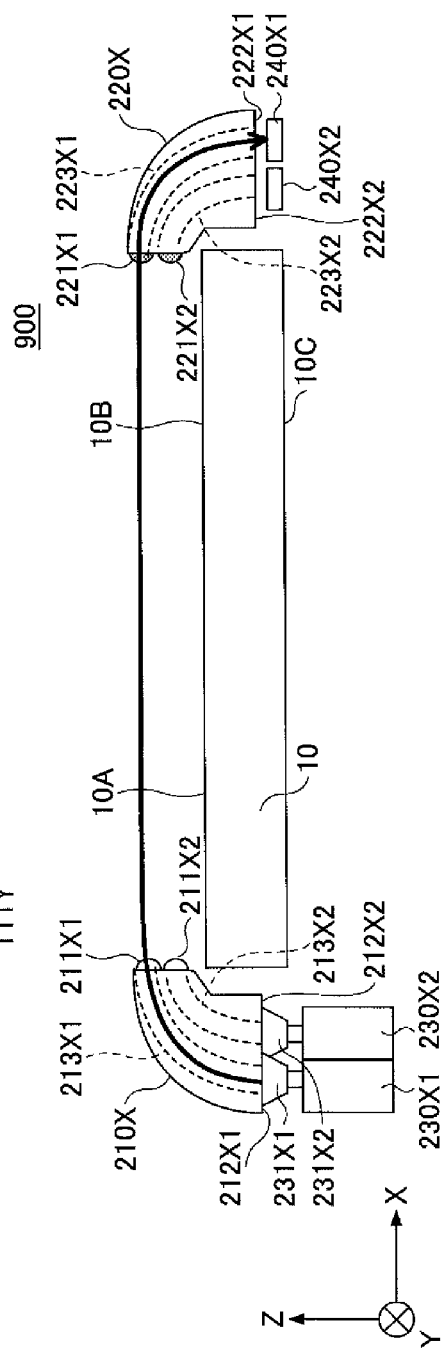
FIG.10A
FIG.10B

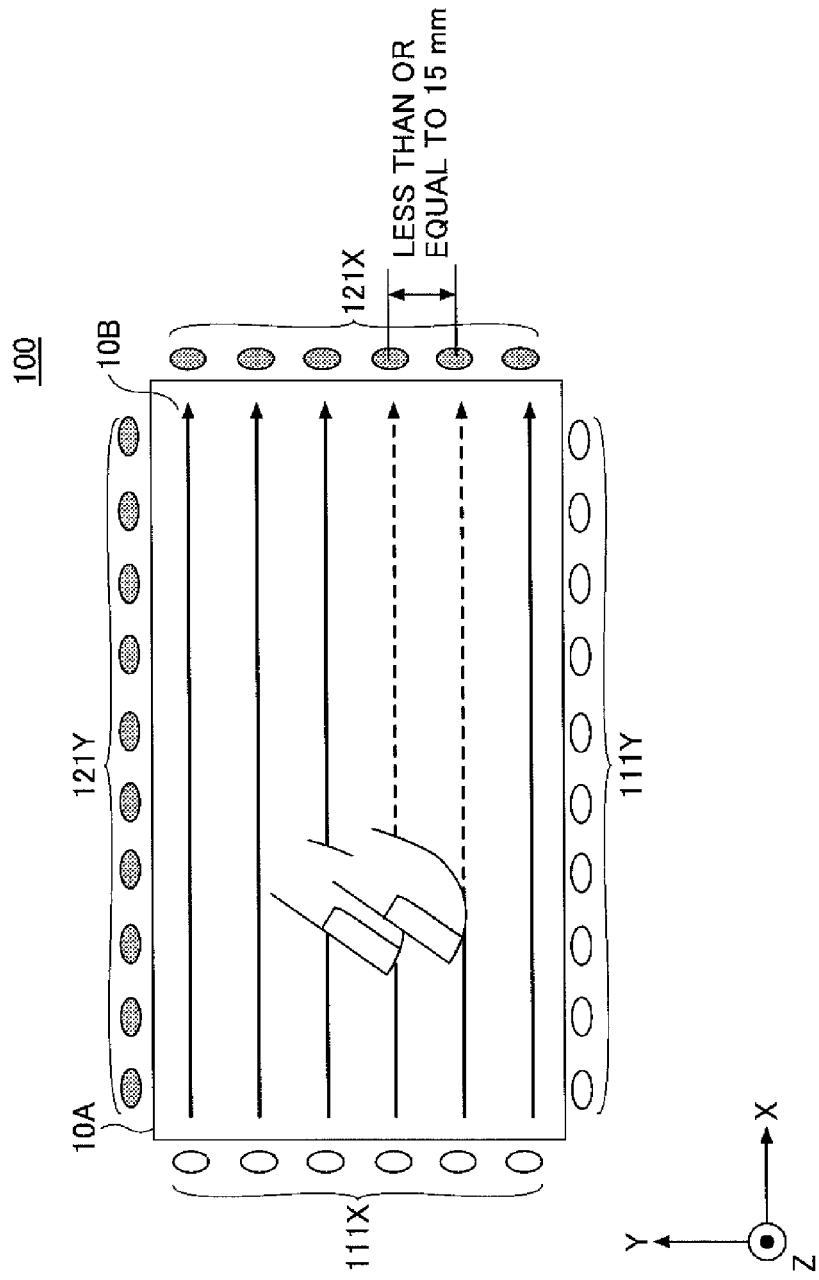

US 8,975,567 B2

COORDINATE DETECTOR

CROSS-REFERENCE TO RELATED APPLICATION

The present application is based upon and claims the benefit of priority of Japanese Patent Application No. 2012-188054, filed on Aug. 28, 2012, the entire contents of which are incorporated herein by reference.

BACKGROUND OF THE INVENTION

1. Field of the Invention

The present invention relates to a coordinate detector.

2. Description of the Related Art

There is a conventional touchscreen panel device that includes light emitters and light receivers that are provided on opposite sides of a rectangular area. The light emitters and the light receivers are positioned on the display screen of a liquid crystal display unit. (See, for example, Japanese Laid-Open Patent Application No. 2009-199259.)

SUMMARY OF THE INVENTION

According to an aspect of the present invention, a coordinate detector for detecting an input operation over a first surface of a display part, which includes a second surface facing away from the first surface, includes a light output part configured to emit light, wherein the light output part is provided in an area around the display part on a side closer to the second surface than to the first surface; a light detection part configured to output a detection signal according to an amount of light that enters the light detection part, wherein the light detection part is provided in the area around the display part on the side closer to the second surface than to the first surface; a first guide part configured to guide light emitted from the light output part toward a direction along the first surface, wherein the first guide part is positioned on a side closer to the first surface than is the light output part; and a second guide part configured to guide, toward the light detection part, light exiting from the first guide part and passing along and over the first surface of the display part, wherein the second guide part is positioned on a side closer to the first surface than is the light detection part, wherein a position of the input operation over the first surface is detected based on the detection signal output by the light detection part.

BRIEF DESCRIPTION OF THE DRAWINGS

FIGS. 2A and 2B are diagrams illustrating the coordinate detector according to the first embodiment;

FIGS. 10A and 10B are diagrams illustrating a configuration of a coordinate detector according to a ninth embodiment;

FIG. 19 is a diagram illustrating an arrangement of exit lenses and entrance lenses in a coordinate detector according to the fifteenth embodiment.

DESCRIPTION OF THE EMBODIMENTS

Embodiments of coordinate detectors according to the present invention are described below with reference to the accompanying drawings.

First Embodiment

Figure 1A:
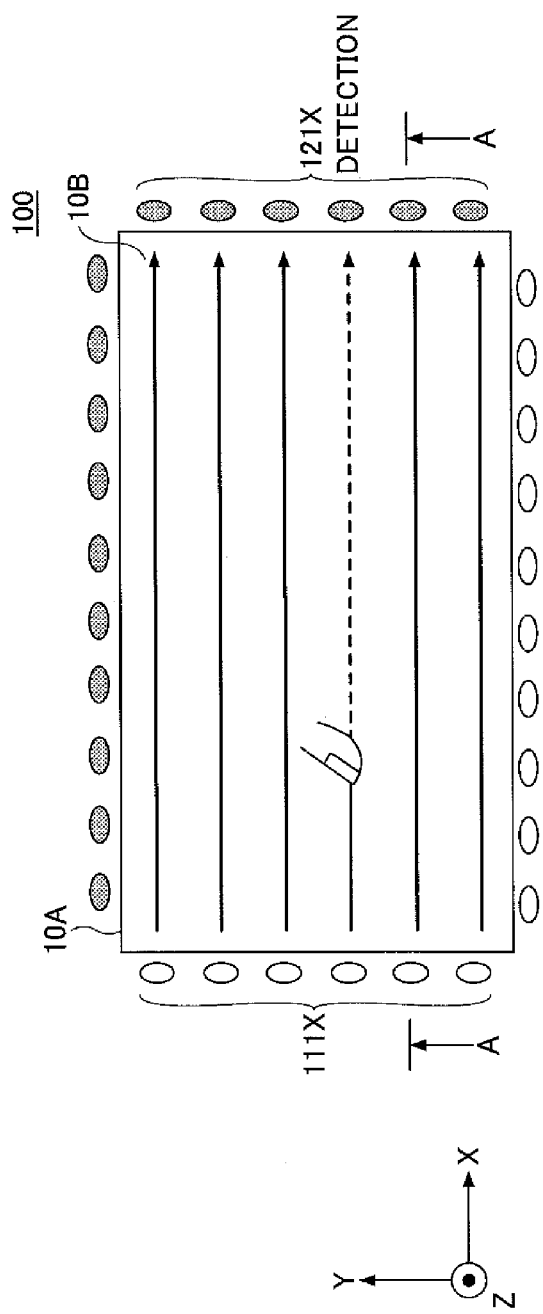
FIGS. 1A and 1B are diagrams illustrating a coordinate detector according to a first embodiment.
Figure 1B:
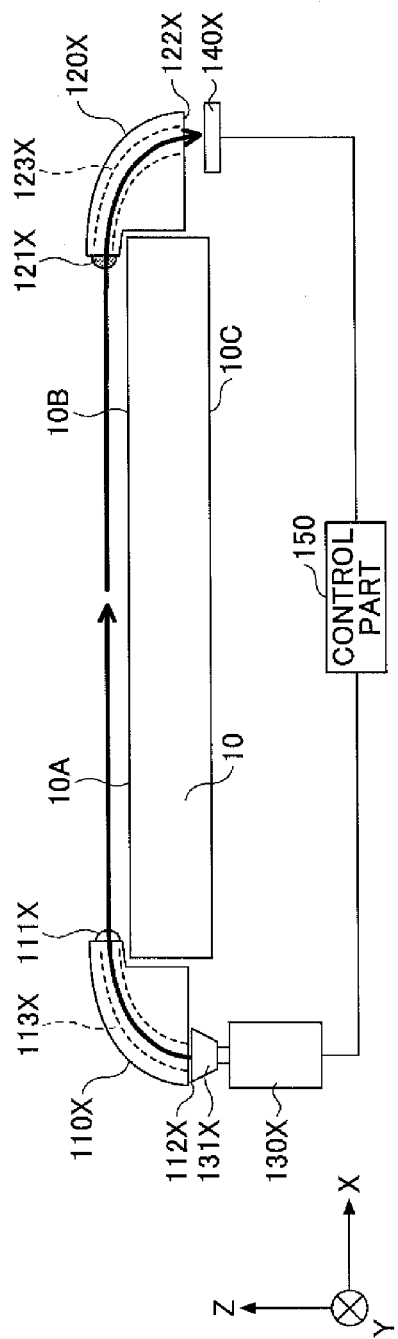

FIGS. 1A and 1B are diagrams illustrating a coordinate detector 100 according to a first embodiment. FIG. 1A is a plan view of a touchscreen panel in which the coordinate detector according to this embodiment is used. FIG. 1B is a diagram illustrating a cross section of the touchscreen panel viewed in a direction indicated by arrows A in FIG. 1A. In FIG. 1A, multiple exit lenses 111X are illustrated with white ellipses and multiple entrance lenses 121X are illustrated with gray ellipses for easier understanding of the configuration of the coordinate detector 100. Furthermore, a light path is indicated by a bold solid arrow in FIGS. 1A and 1B. As illustrated, an xyz coordinate system, which is a Cartesian coordinate system, is defined in FIGS. 1A and 1B. In the drawings, the directions indicated by arrows X, Y, and Z are referred to as "an x-axis direction, a y-axis direction, and a z-axis direction," respectively. Furthermore, an illustrated element is either defined in the positive x-axis, y-axis, or z-axis direction or the negative x-axis, y-axis, or z-axis direction.

FIGS. 1A and 1B illustrate part of the coordinate detector 100 that is associated with position detection in the y-axis direction.

Referring to FIG. 1B, the coordinate detector 100 is attached to a liquid crystal display (LCD) 10. Here, the LCD 10 of the embodiment is described as an element independent of the coordinate detector 100, and the coordinate detector 100 and the LCD 10 are elements of a touchscreen panel.

The coordinate detector 100 includes light guides 110X and 120X, light sources 130X, light-receiving elements 140X, and a control part 150. The LCD 10 is illustrated as a box having a rectangular shape. The LCD 10, which is longer in the x-axis direction than in the y-axis direction, is an example of a display part.

The light guide 110X includes the exit lenses 111X, entrance ends 112X, and waveguides 113X. The light guide 110X is provided along a side of the LCD 10 extending in the y-axis direction on the side of the LCD 10 in the negative x-axis direction. The light guide 110X is an example of a first guide part.

In a plan view, the exit lenses 111X are arranged along the side of the LCD 10 extending in the y-axis direction on the side of the LCD 10 in the negative x-axis direction as illustrated in FIG. 1A.

In FIG. 1A, for easier understanding, the exit lenses 111X are illustrated as being arranged beside a display section 10A, which is an area where an image is displayed, of the LCD 10. In a plan view (that is, in an x-y plane), the display section 10A is slightly smaller in size than the LCD 10. Thus, the exit lenses 111X are positioned outside the display section 10A.

As illustrated in FIGS. 1A and 1B, the light guide 110X includes the exit lenses 111X, and as many entrance ends 112X and as many waveguides 113X as the exit lenses 111X are arranged.

Referring to FIG. 1B, each of the entrance ends 112X, which is an end part of the light guide 110X that light from the corresponding light source 130X enters, is the entrance of the corresponding waveguide 113X. A lens may be formed at each entrance end 112X. The lenses may be similar to the exit lenses 111X.

Each of the waveguides 113X curves substantially 90° from the entrance end 112X to communicate with the corresponding exit lens 111X, which is provided at the exit end of the light guide 110X. Waveguides 113X are arranged parallel to each other in the y-axis direction.

Each of the waveguides 113X is formed of a core material. Part of the light guide 110X that surrounds the waveguide 113X along a direction to guide light is formed of a cladding material. The waveguide 113X is unitarily formed with the corresponding exit lens 111X, so that the exit lens 111X as well is formed of a core material.

The light guide 110X as described above may be formed of a flexible printed circuit (FPC). Alternatively, the light guide 110X may be monolithically formed of an olefin resin.

The light guide 120X includes the entrance lenses 121X, exit ends 122X, and waveguides 123X. The light guide 120X is provided along a side of the LCD 10 extending in the y-axis direction on the side of the LCD 10 in the positive x-axis direction. The light guide 120X is an example of a second guide part.

In a plan view, the entrance lenses 121X are arranged along the side of the LCD 10 extending in the y-axis direction on the side of the LCD 10 in the positive x-axis direction as illustrated in FIG. 1A. The number of the entrance lenses 121X is equal to the number of the exit lenses 111X and to the number of the waveguides 113X. In FIG. 1B as well, the entrance lenses 121X are distinctively illustrated in gray for easier understanding.

In FIG. 1A, for easier understanding, the entrance lenses 121X are illustrated as being arranged beside the display section 10A of the LCD 10. As similar to the exit lenses 111X, the entrance lenses 121X are positioned outside the display section 10A.

Referring to FIG. 1B, each of the entrance lenses 121X is provided at the entrance end of the light guide 120X, where light exiting from the exit lens 111X of the light guide 110X and passing over a surface 10B of the LCD 10 enters the light guide 120X. The entrance lens 121X is the entrance of the corresponding waveguide 123X.

Each of the waveguides 123X curves substantially 90° from the corresponding entrance lens 121X to the exit end 122X so as to communicate with the exit end 122X. As many waveguides 123X as the entrance lenses 121X are arranged parallel to each other in the y-axis direction.

Each of the waveguides 123X is formed of a core material. Part of the light guide 120X that surrounds the waveguide 123X along a direction to guide light is formed of a cladding material. The waveguide 123X is unitarily formed with the corresponding entrance lens 121X, so that the entrance lens 121X as well is formed of a core material.

Each of the exit ends 122X is an end part of the light guide 120X where light exits from the light guide 120X. The exit end 122X is also the exit part of the corresponding waveguide 123X. A lens similar to the entrance lens 121X may be formed at the exit end 122X.

The light guide 120X as described above may be formed of a flexible printed circuit (FPC). Alternatively, the light guide 120X may be monolithically formed of an olefin resin.

Referring to FIG. 1B, the light source 130X is provided beneath the entrance end 112X of the light guide 110X. Each of output parts 131X of the light sources 130X is disposed to face the corresponding entrance end 112X of the light guide 110X. The distance between the entrance end 112X and the corresponding output part 131X is, for example, 300 μm. Each of the light sources 130X is an example of a light output part. The number of the light sources 130X arranged is equal to the number of the exit lenses 111X, the number of the entrance ends 112X, and the number of the waveguides 113X of the light guide 110X.

The light sources 130X may be, but are not limited to, light emitting diode (LED)s or vertical cavity surface emitting laser (VCSEL)s, for example.

The LCD 10 includes a surface 10C, which faces away from the surface 10B. The light sources 130X are provided at positions lower than the surface 10B of the LCD 10, that is, on the side closer to the surface 100 than to the surface 10B, in order to reduce the thickness of the coordinate detector 100.

According to the coordinate detector 100 of the first embodiment, an upper part of the light guide 110X is positioned higher than the surface 10B of the LCD 10. It is possible, however, to reduce the thickness of the coordinate detector 100 compared with the case of providing the light sources 130X over the surface 10B of the LCD 10.

Referring to FIG. 1B, each of the light-receiving elements 140X is provided beneath the corresponding exit end 122X of the light guide 120X. The light-receiving element 140X is disposed to face the corresponding exit end 122X of the light guide 120X. The light-receiving elements 140X are arranged in the y-axis direction. The number of the light-receiving elements 140X is equal to the number of the entrance lenses 121X and to the number of the waveguides 123X. Each of the light-receiving elements 140X is an example of a light detection part. The distance between each of the exit ends 122X and the corresponding light-receiving element 140X is, for example, 300 μm.

The light-receiving elements 140X may be, but are not limited to, phototransistors, for example.

The control part 150 is connected to the light sources 130X and the light-receiving elements 140X. The control part 150 causes the light sources 130X to emit light in order, so that the light-receiving elements 140X receive light in order.

In the coordinate detector 100 of the first embodiment as described above, light beams emitted from the respective light sources 130X are guided by the light guide 110X to exit from the exit lenses 111X. Then, the light beams travel along the surface 10B of the LCD 10 through the space above the surface 10B of the LCD 10 to enter the light guide 120X through the entrance lenses 121X. The light beams are guided to the light-receiving elements 140X by the light guide 120X.

Here, as illustrated in FIG. 1A, if a finger of a user is placed on or over the surface 10B of the LCD 10, one or more of the light beams exiting from the exit lenses 111X are prevented from reaching the corresponding light-receiving elements 140X. FIG. 1A illustrates a case where one of six light beams is blocked by a finger and is prevented from reaching a corresponding one of the light-receiving elements 140X. In practice, however, a larger number of light beams are caused to travel parallel to each other over the surface 10B of the LCD 10.

It is possible to detect the position of an operation input in the y-axis direction by determining the position of a light-receiving element 140X that has stopped receiving a light beam among the light-receiving elements 140X in the control part 150.

FIGS. 2A and 2B are diagrams illustrating the coordinate detector 100 of this embodiment. FIG. 2A is a plan view of the touchscreen panel according to this embodiment. FIG. 2B is a diagram illustrating a cross section of the touchscreen panel viewed in a direction indicated by arrows B in FIG. 2A. FIGS. 2A and 2B illustrate part of the coordinate detector 100 that is associated with position detection in the x-axis direction.

Referring to FIG. 2B, the coordinate detector 100 includes light guides 110Y and 120Y, light sources 130Y, light-receiving elements 140Y, and the control part 150. The control part 150 is the same as the control part 150 illustrated in FIG. 1B.

The light guide 110Y includes exit lenses 111Y, entrance ends 112Y, and waveguides 113Y. The light guide 110Y is provided along a side of the LCD 10 extending in the x-axis direction on the side of the LCD 10 in the negative y-axis direction. The light guide 110Y is an example of the first guide part.

In a plan view, the exit lenses 111Y are arranged along the side of the LCD 10 extending in the x-axis direction on the side of the LCD 10 in the negative y-axis direction as illustrated in FIG. 2A.

In FIG. 2A, for easier understanding, the exit lenses 111Y are illustrated as being arranged beside the display section 10A of the LCD 10. Similar to the lenses 111X and 121X, the exit lenses 111Y are positioned outside the display section 10A.

As illustrated in FIGS. 2A and 2B, the light guide 110Y includes the exit lenses 111Y, and as many entrance ends 112Y and as many waveguides 113Y as the exit lenses 111Y are arranged.

Referring to FIG. 2B, the entrance end 112Y, which is an end part of the light guide 110Y that light from the corresponding light source 130Y enters, is the entrance of the corresponding waveguide 113Y. As many lenses as the exit lenses 111Y may be formed at the entrance ends 112Y. The lenses may be similar to the exit lenses 111Y.

Each of the waveguides 113Y curves substantially 90° from the corresponding entrance end 112Y to communicate with the corresponding exit lens 111Y, which is provided at the exit end of the light guide 110Y. As many waveguides 113Y as the exit lenses 111Y are arranged parallel to each other in the x-axis direction.

Each of the waveguides 113Y is formed of a core material. Part of the light guide 110Y that surrounds the waveguide 113Y along a direction to guide light is formed of a cladding material. The waveguide 113Y is unitarily formed with the corresponding exit lens 111Y, so that the exit lens 111Y as well is formed of a core material.

The light guide 110Y as described above may be formed of a flexible printed circuit (FPC). Alternatively, the light guide 110Y may be monolithically formed of an olefin resin.

The light guide 120Y includes entrance lenses 121Y, exit ends 122Y, and waveguides 123Y. The light guide 120Y is provided along a side of the LCD 10 extending in the x-axis direction on the side of the LCD 10 in the positive y-axis direction. The light guide 120Y is an example of the second guide part.

In a plan view, the entrance lenses 121Y are arranged along the side of the LCD 10 extending in the x-axis direction on the side of the LCD 10 in the positive y-axis direction as illustrated in FIG. 2A. The number of the entrance lenses 121Y is equal to the number of the exit lenses 111Y and to the number of the waveguides 113Y. In FIGS. 2A and 2B, the entrance lenses 121Y are distinctively illustrated in gray for easier understanding.

In FIG. 2A, for easier understanding, the entrance lenses 121Y are illustrated as being arranged beside the display section 10A of the LCD 10. Similar to the exit lenses 111Y, the entrance lenses 121Y are positioned outside the display section 10A.

Referring to FIG. 2B, each of the entrance lenses 121Y is provided at the entrance end of the light guide 120Y, where light exiting from the corresponding exit lens 111Y of the light guide 110Y and passing over the surface 10B of the LCD 10 enters the light guide 120Y. The entrance lens 121Y is the entrance of the corresponding waveguide 123Y.

Each of the waveguides 123Y curves substantially 90° from the corresponding entrance lens 121Y to the corresponding exit end 122Y so as to communicate with the exit end 122Y. As many waveguides 123Y as the entrance lenses 121Y are arranged parallel to each other in the x-axis direction.

Each of the waveguides 123Y is formed of a core material. Part of the light guide 120Y that surrounds the waveguide 123Y along a direction to guide light is formed of a cladding material. The waveguide 123Y is unitarily formed with the corresponding entrance lens 121Y, so that the entrance lens 121Y as well is formed of a core material.

Each of the exit ends 122Y is an end part of the light guide 120Y where light exits from the light guide 120Y. The exit end 122Y is also the exit part of the corresponding waveguide 123Y. A lens similar to the entrance lens 121Y may be formed at the exit end 122Y.

The light guide 120Y as described above may be formed of a flexible printed circuit (FPC). Alternatively, the light guide 120Y may be monolithically formed of an olefin resin.

Referring to FIG. 2B, each of the light sources 130Y is provided on the side of the corresponding entrance end 112Y of the light guide 110Y in the negative z-axis direction. Each of output parts 131Y of the light sources 130Y is disposed to face the corresponding entrance end 112Y of the light guide 110Y. The distance between the entrance end 112Y and the corresponding output part 131Y is, for example, 300 μm. Each of the light sources 130Y is an example of the light output part. The number of the light sources 130Y arranged is equal to each of the number of the exit lenses 111Y, the number of the entrance ends 112Y, and the number of the waveguides 113Y of the light guide 110Y.

The light sources 130Y may be, but are not limited to, light emitting diode (LED)s or vertical cavity surface emitting laser (VCSEL)s, for example.

The light sources 130Y are provided at positions lower than the surface 10B of the LCD 10 in the negative z-axis direction, that is, on the surface 10C side opposite to the surface 10B, in order to reduce the thickness of the coordinate detector 100.

According to the coordinate detector 100 of the first embodiment, an upper part of the light guide 110Y is positioned higher than the surface 10B of the LCD 10. It is possible, however, to reduce the thickness of the coordinate detector 100 compared with the case of providing the light sources 130Y over the surface 10B of the LCD 10.

Referring to FIG. 2B, each of the light-receiving elements 140Y is provided on the side of the corresponding exit end 122Y of the light guide 120Y in the negative z-axis direction. The light-receiving element 140Y is disposed to face the corresponding exit end 122Y of the light guide 120Y. The light-receiving elements 140Y are arranged in the x-axis direction. The number of the light-receiving elements 140Y is equal to the number of the entrance lenses 121Y and to the number of the waveguides 123Y. Each of the light-receiving elements 140Y is an example of the light detection part. The distance between the exit end 122Y and the corresponding light-receiving element 140Y is, for example, 300 μm.

The light-receiving elements 140Y may be, but are not limited to, phototransistors, for example.

The control part 150 is connected to the light sources 130Y and the light-receiving elements 140Y. The control part 150 causes the light sources 130Y to emit light in order, so that the light-receiving elements 140Y receive light in order.

In the coordinate detector 100 of the first embodiment as described above, light beams emitted from the respective light sources 130Y are guided by the light guide 110Y to exit from the exit lenses 111Y. Then, the light beams travel along the surface 10B of the LCD 10 through the space above the surface 10B of the LCD 10 to enter the light guide 120Y through the entrance lenses 121Y. The light beams are guided to the light-receiving elements 140Y by the light guide 120Y.

Here, as illustrated in FIG. 2A, if a finger of a user is placed on or over the surface 10B of the LCD 10, one or more of the light beams exiting from the exit lenses 111Y are prevented from reaching the corresponding light-receiving elements 140Y. FIG. 2A illustrates a case where one of ten light beams is blocked by a finger and is prevented from reaching a corresponding one of the light-receiving elements 140Y. In practice, however, a larger number of light beams are caused to travel parallel to each other over the surface 10B of the LCD 10.

In such a case, it is possible to detect the position of an operation input in the x-axis direction by determining the position of the light-receiving element 140Y that has stopped receiving a light beam among the multiple light-receiving elements 140Y in the control part 150.

In the above description, elements for detecting a coordinate in the y-axis direction are described with FIGS. 1A and 1B and elements for detecting a coordinate in the x-axis direction are described with FIGS. 2A and 2B for convenience of description.

The coordinate detector 100 of the first embodiment, however, includes elements for detecting a coordinate in the x-axis direction and elements for detecting a coordinate in the y-axis direction. That is, the coordinate detector 100 includes the light guides 110X and 120X, the light sources 130X, and the light-receiving elements 140X; and the light guides 110Y and 120Y, the light sources 130Y, and the light-receiving elements 140Y, and detects the x-coordinate and y-coordinate of the position of an operation input.

As described above, according to the coordinate detector 100 of the first embodiment, the light sources 130X and 130Y and the light-receiving elements 140X and 140Y are provided relatively closer to the lower surface 100 of the LCD 10, that is, positioned lower than the surface 10B. Therefore, the thickness of the coordinate detector 100 is reduced. The reduction of the thickness of the coordinate detector 100 is equivalent to the reduction of the thickness of a touchscreen panel that includes the coordinate detector 100 and the LCD 10.

It is difficult to reduce the thickness of conventional coordinate detectors because light sources and light-receiving elements are disposed over the surface 10B of the LCD 10. In contrast, the thickness of the coordinate detector 100 of the first embodiment is reduced by providing the light sources 130X and 130Y and the light-receiving elements 140X and 140Y on the lower surface 100 side of the LCD 10 and using the light guides 110X, 120X, 110Y, and 120Y.

The coordinate detector 100 of the first embodiment is an optical coordinate detector that detects the coordinate position of an operation input by receiving light beams emitted from the light sources 130X and 130Y by the light-receiving elements 140X and 140Y through the light guides 110X and 120X and the light guides 110Y and 120Y, respectively.

Therefore, a finger of a user does not have to touch the surface 10B of the LCD 10, but may be positioned above the surface 10B of the LCD 10 to block light. In this respect, the coordinate detector 100 of the first embodiment is different from resistive-type or capacitive-type coordinate detectors that detect the position of a contact. Accordingly, an operation input may be completed by blocking light with, for example, the tip of a pen.

Second Embodiment

Figure 3:
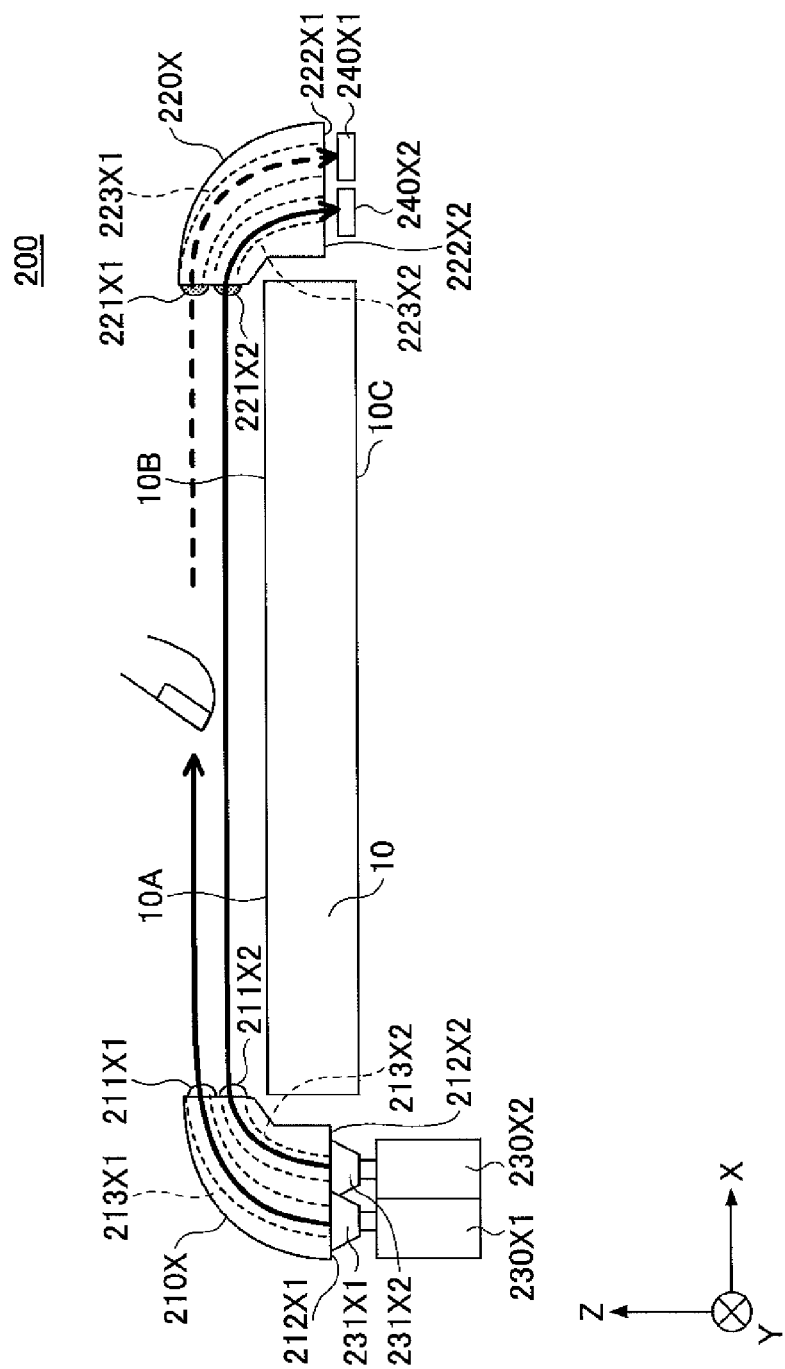
FIG. 3 is a diagram illustrating a configuration of a coordinate detector according to a second embodiment.

FIG. 3 is a diagram illustrating a configuration of a coordinate detector 200 according to a second embodiment. The coordinate detector 200 of the second embodiment is a variation of the coordinate detector 100 of the first embodiment. Therefore, with respect to the coordinate detector 200, the same elements as those of the coordinate detector 100 of the first embodiment are referred to by the same reference numerals, and their description is omitted.

FIG. 3 is a diagram illustrating a cross section of the coordinate detector 200.

Referring to FIG. 3, the coordinate detector 200 is attached to the LCD 10 as similar to the first embodiment.

The coordinate detector 200 includes light guides 210X and 220X, light sources 230X1 and 230X2, and light-receiving elements 240X1 and 240X2. In FIG. 3, the illustration of the control part 150 is omitted. Like in the first embodiment, however, the control part 150 is connected to the light sources 230X1 and 230X2 and to the light-receiving elements 240X1 and 240X2, and performs position detection by performing the same control as in the first embodiment.

The light guide 210X includes exit lenses 211X1 and 211X2, entrance ends 212X1 and 212X2, and waveguides 213X1 and 213X2. The exit lenses 211X1 and 211X2, the entrance ends 212X1 and 212X2, and the waveguides 213X1 and 213X2 correspond to two sets of the exit lenses 111X, the entrance ends 112X, and the waveguides 113X, respectively, of the first embodiment, which are placed in two tiers in the z-axis direction.

The light guide 210X is provided along a side of the LCD 10 extending in the y-axis direction on the side of the LCD 10 in the negative x-axis direction. The light guide 210X is an example of a first guide part.

In a plan view, the exit lenses 211X1 and 211X2 are arranged along the side of the LCD 10 extending in the y-axis direction.

Referring to FIG. 3, the entrance ends 212X1 and 212X2, which are end parts of the light guide 210X that light from the light sources 230X1 and light from the light sources 230X2 enter, respectively, are the entrances of the waveguides 213X1 and 213X2. A lens may be formed at each of the entrance ends 212X1 and 212X2. The lenses may be similar to the exit lenses 211X1 and 212X2.

The waveguides 213X1 and 213X2 curve substantially 90° from the entrance ends 212X1 and 212X2 to communicate with the exit lenses 211X1 and 211X2, respectively, which are provided at the exit end of the light guide 210X. Waveguides 213X1 are arranged parallel to each other in the y-axis direction. Waveguides 213X2 are arranged parallel to each other in the y-axis direction.

The waveguides 213X1 and 213X2 are formed of a core material. Part of the light guide 210X that surrounds the waveguides 213X1 and 213X2 along a direction to guide light is formed of a cladding material. The waveguides 213X1 and 213X2 are unitarily formed with the exit lenses 211X1 and 211X2, respectively, so that the exit lenses 211X1 and 211X2 as well are formed of a core material.

The light guide 210X as described above may be formed of a flexible printed circuit (FPC). Alternatively, the light guide 210X may be monolithically formed of an olefin resin.

The light guide 220X includes entrance lenses 221X1 and 221X2, exit ends 222X1 and 222X2, and waveguides 223X1 and 223X2. The light guide 220X is provided along a side of the LCD 10 extending in the y-axis direction on the side of the LCD 10 in the positive x-axis direction. The light guide 220X is an example of a second guide part.

In a plan view, the entrance lenses 221X1 and 221X2 are arranged along the side of the LCD 10 extending in the y-axis direction on the side of the LCD 10 in the positive x-axis direction. The number of the entrance lenses 221X1 is equal to the number of the exit lenses 211X1 and to the number of the waveguides 213X1. The number of the entrance lenses 221X2 is equal to the number of the exit lenses 211X2 and to the number of the waveguides 213X2. In FIG. 3, the entrance lenses 221X1 and 221X2 are distinctively illustrated in gray for easier understanding.

The entrance lenses 221X1 and 221X2 are provided at the entrance end of the light guide 220X, where light exiting from the exit lenses 211X1 and 211X2 of the light guide 210X and passing over the surface 10B of the LCD 10 enters the light guide 220X. The entrance lenses 221X1 and 221X2 are the entrances of the waveguides 223X1 and 223X2, respectively.

The waveguides 223X1 and 223X2 curve substantially 90° from the entrance lenses 221X1 and 221X2 to the exit ends 222X1 and 222X2 so as to communicate with the exit ends 222X1 and 222X2, respectively. As many waveguides 223X1 as the entrance lenses 221X1 are arranged parallel to each other in the y-axis direction. As many waveguides 223X2 as the entrance lenses 221X2 are arranged parallel to each other in the y-axis direction.

The waveguides 223X1 and 223X2 are formed of a core material. Part of the light guide 220X that surrounds the waveguides 223X1 and 223X2 along a direction to guide light is formed of a cladding material. The waveguides 223X1 and 223X2 are unitarily formed with the entrance lenses 221X1 and 221X2, respectively, so that the entrance lenses 221X1 and 221X2 as well are formed of a core material.

The exit ends 222X1 and 222X2 are an end part of the light guide 220X where light exits from the light guide 220X. The exit ends 222X1 and 222X2 are also the exit parts of the waveguides 223X1 and 223X2, respectively. Lenses similar to the entrance lenses 221X1 and 221X2 may be formed at the exit ends 222X1 and 222X2, respectively.

The light guide 220X as described above may be formed of a flexible printed circuit (FPC). Alternatively, the light guide 220X may be monolithically formed of an olefin resin.

The light sources 230X1 and 230X2 are provided beneath the entrance ends 212X1 and 212X2, respectively, of the light guide 210X. Output parts 231X1 and 231X2 of the light sources 230X1 and 230X2 are disposed to face the entrance ends 212X1 and 212X2, respectively, of the light guide 210X. The distance between the entrance ends 212X1 and 212X2 and the output parts 231X1 and 231X2 is, for example, 300 μm. The light sources 230X1 and 230X2 are an example of a light output part.

The light sources 230X1 and 230X2 may be, but are not limited to, light emitting diode (LED)s or vertical cavity surface emitting laser (VCSEL)s, for example.

The light sources 230X1 and 230X2 are provided at positions lower than the surface 10B of the LCD 10, that is, on the side closer to the surface 10C than to the surface 102, in order to reduce the thickness of the coordinate detector 200.

According to the coordinate detector 200 of the second embodiment, an upper part of the light guide 210X is positioned higher than the surface 102 of the LCD 10. It is possible, however, to reduce the thickness of the coordinate detector 200 compared with the case of providing the light sources 230X1 and 230X2 over the surface 10B of the LCD 10.

The light-receiving elements 240X1 and 240X2 are provided beneath the exit ends 222X1 and 222X2, respectively, of the light guide 220X. The light-receiving elements 240X1 and 240X2 are disposed to face the exit ends 222X1 and 222X2, respectively, of the light guide 220X. The light-receiving elements 240X1 and 240X2 are arranged in the y-axis direction. The number of the light-receiving elements 240X1 is equal to the number of the entrance lenses 221X1 and to the number of the waveguides 223X1. The number of the light-receiving elements 240X2 is equal to the number of the entrance lenses 221X2 and to the number of the waveguides 223X2. The light-receiving elements 240X1 and 240X2 are an example of a light detection part. The distance between the exit ends 222X1 and 222X2 and the light-receiving elements 240X1 and 240X2 is, for example, 300 μm.

The light-receiving elements 240X1 and 240X2 may be, but are not limited to, phototransistors, for example.

Like the elements associated with detection in the y-axis direction, which are illustrated in FIG. 3, the elements associated with detection in the x-axis direction have a two-tier structure.

In the coordinate detector 200 of the second embodiment as described above, light beams emitted from the respective light sources 230X1 and 230X2 are guided by the light guide 210X to exit from the exit lenses 211X1 and 211X2, respectively. Then, the light beams travel along the surface 10B of the LCD 10 through the space above the surface 10B of the LCD 10 to enter the light guide 220X through the entrance lenses 221X1 and 221X2. The light beams are guided to the light-receiving elements 240X1 and 240X2 by the light guide 220X.

Here, as illustrated in FIG. 3, if a finger of a user is placed on or over the surface 10B of the LCD 10, one or more of the light beams exiting from the exit lenses 211X1 and 211X2 are prevented from reaching the corresponding light-receiving elements 240X1 and/or 240X2.

It is possible to detect the position of an operation input in the y-axis direction by determining the position of one or more of the light-receiving elements 240X1 and 240X2 that have stopped receiving a light beam.

According to the coordinate detector 200 of the second embodiment, two light beams travel over the surface 10B of the LCD 10 at different levels in the z-axis direction. Therefore, twice as many light beams as those in the coordinate detector 100 of the first embodiment are provided in two tiers, placed one over the other in the z-axis direction.

Therefore, it is possible to detect the blockage of an upper light beam and the blockage of both of an upper light beam and a lower light beam.

Accordingly, it is possible to perform detection in a stepwise manner. For example, when an operation input is made with a member that is tapered toward the end, such as the tip of a pen, the amount of light blocked differs between an upper light beam and a lower light beam. Therefore, in such a case, the upper light beam and the lower light beam may be processed independent of each other. For example, none of the lower light beams is emitted until any of the upper light beams is blocked, and the lower light beams may be emitted in response to the blockage of any of the upper light beams.

Alternatively, the upper light beam and the lower light beam may be detected together instead of being detected independently. For example, even when a small foreign substance adheres to the surface 10B of the LCD 10 to block one or more of the lower light beams, it is possible to detect an operation input at the position of the foreign substance by employing the upper light beams.

Third Embodiment

Figure 4:
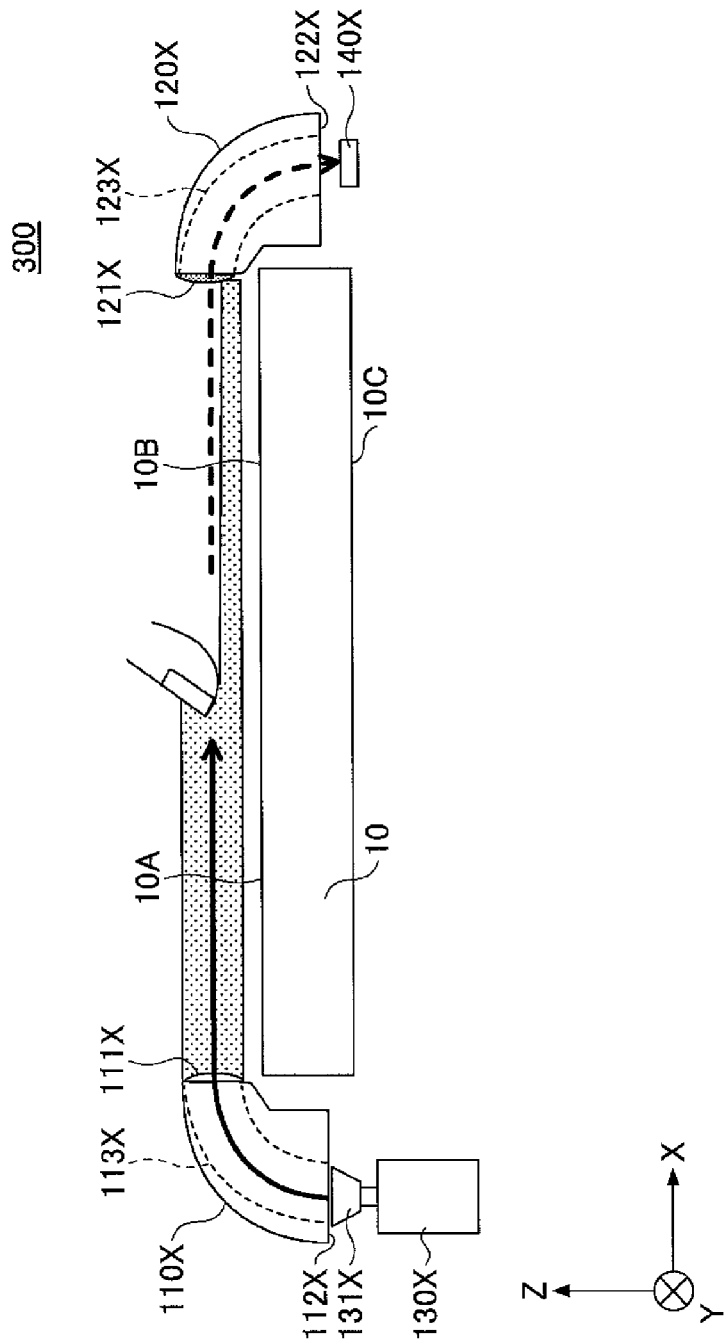
FIG. 4 is a diagram illustrating a configuration of a coordinate detector according to a third embodiment.

FIG. 4 is a diagram illustrating a configuration of a coordinate detector 300 according to a third embodiment. The coordinate detector 300 of the third embodiment is a variation of the coordinate detector 100 of the first embodiment. Therefore, with respect to the coordinate detector 300, the elements same as or similar to those of the coordinate detector 100 of the first embodiment are referred to by the same reference numerals, and their description is omitted. In FIG. 4, the illustration of the control part 150 is omitted. Like in the first embodiment, however, the control part 150 is connected to light sources and light-receiving elements, and performs position detection by performing the same control as in the first embodiment.

In the coordinate detector 300 of the third embodiment, the exit lenses 111X and 111Y and the entrance lenses 121X and 121Y of the coordinate detector 100 of the first embodiment are vertically elongated in the z-axis direction, relative to the lenses of the first embodiment. FIG. 4 illustrates elements associated with detection in the y-axis direction.

In the following description, all the elements are referred to by the same reference numerals as those of the elements of the coordinate detector 100 of the first embodiment.

As illustrated in FIG. 4, light vertically elongated relative to the first embodiment is emitted when the vertically elongated exit lens 111X and entrance lens 121X are used. Therefore, when a finger of a user is not in contact with the surface 10B of the LCD 10 but is positioned above the surface 10B of the LCD 10 to block approximately half a light beam in the z-axis direction as illustrated in FIG. 4, the amount of light received by the light-receiving element 140 is approximately halved.

Coordinate detection may be equally performed comparing to the first embodiment even when the amount of light received is halved. Therefore, use of such a change in the amount of light makes it possible to perform control according to the amount of light in addition to position detection.

Fourth Embodiment

Figure 5:
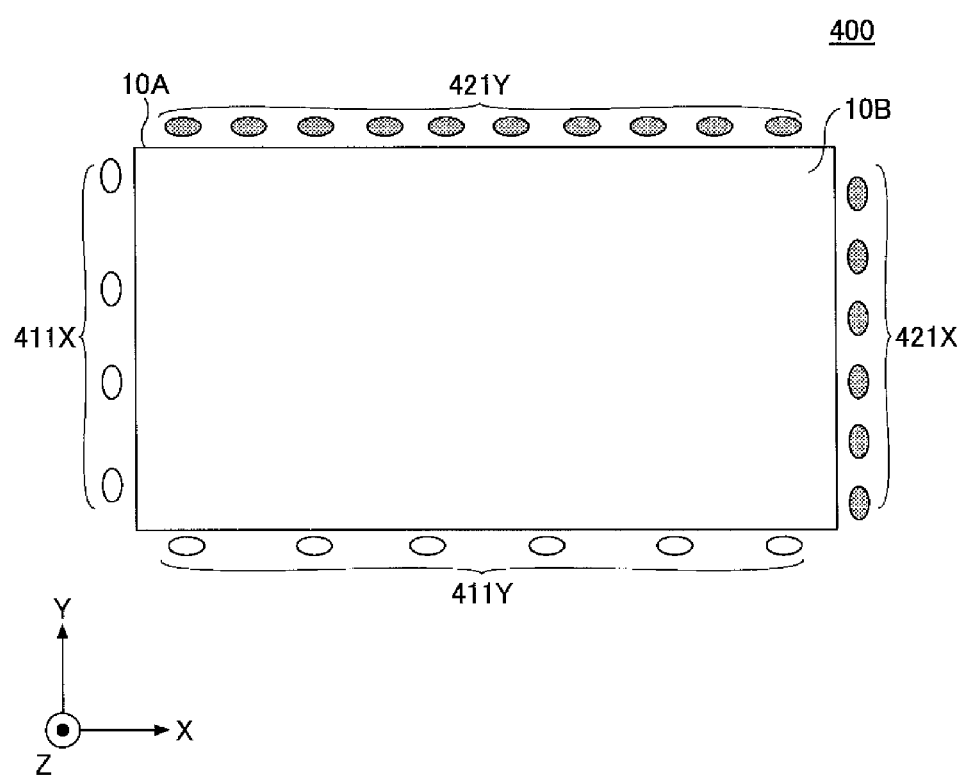
FIG. 5 is a diagram illustrating a configuration of a coordinate detector according to a fourth embodiment.

FIG. 5 is a diagram illustrating a configuration of a coordinate detector 400 according to a fourth embodiment. In the following description of the fourth embodiment, the same elements as those of the first through third embodiments are referred to by the same reference numerals, and their description is omitted.

The coordinate detector 400 is different from the coordinate detector 100 of the first embodiment in that the number of exit lenses and the number of entrance lenses are different.

For example, referring to FIG. 5, the number of exit lenses 411X and the number of exit lenses 411Y are smaller than the number of the exit lenses 111X and the number of the exit lenses 111Y, respectively, of the coordinate detector 100 illustrated in FIGS. 1A and 2A, so as to be different from the number of entrance lenses 421X and the number of entrance lenses 421Y, respectively.

In the case where light widens to some extent during its propagation, it is possible to detect an x-coordinate and a y-coordinate even when the number of the exit lenses 411X and the number of the exit lenses 411Y are thus different from the number of the entrance lenses 421X and the number of the entrance lenses 421Y, respectively.

Fifth Embodiment

Figure 6:
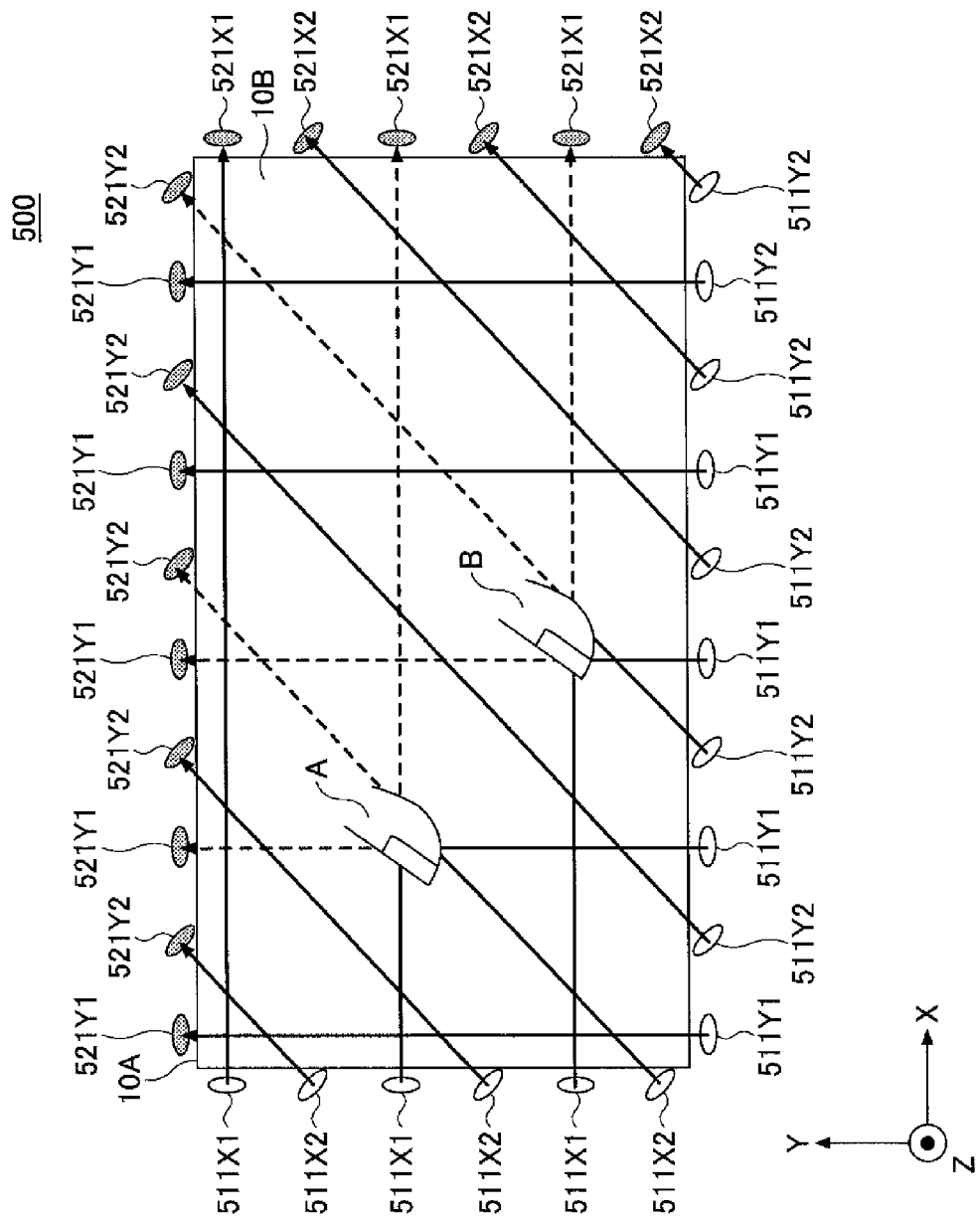
FIG. 6 is a diagram illustrating a configuration of a coordinate detector according to a fifth embodiment.

FIG. 6 is a diagram illustrating a configuration of a coordinate detector 500 according to a fifth embodiment. In the following description of the fifth embodiment, the same elements as those of the first through fourth embodiments are referred to by the same reference numerals, and their description is omitted.

The coordinate detector 500 is different from the coordinate detector 100 of the first embodiment in the arrangement of exit lenses and entrance lenses.

For example, referring to FIG. 6, light is transmitted from exit lenses 511X1 and 511Y1 to entrance lenses 521X1 and 521Y1 along the x-axis direction and the y-axis direction, respectively, while light is transmitted from exit lenses 511X2 and 511Y2 to entrance lenses 521X2 and 521Y2 at an angle to each of the x-axis direction and the y-axis direction.

This configuration may be implemented by preparing another set of the light guides 110X, 120X, 110Y, and 120Y, the light sources 130X and 130Y, and the light-receiving elements 140X and 140Y of the first embodiment and causing light to exit and enter at an angle to the x-axis direction and the y-axis direction.

For example, when a finger is placed at Position A in FIG. 6, a decrease in the intensity of light may be detected through three entrance lenses: the second entrance lens 521Y1 from the side in the negative x-axis direction, the third entrance lens 521Y2 from the side in the negative x-axis direction, and the second entrance lens 521X1 from the side in the negative y-axis direction.

Furthermore, for example, when a finger is placed at Position B in FIG. 6, a decrease in the intensity of light may be detected through three entrance lenses: the third entrance lens 521Y1 from the side in the negative x-axis direction, the fifth entrance lens 521Y2 from the side in the negative x-axis direction, and the first entrance lens 521X1 from the side in the negative y-axis direction.

That is, in the coordinate detector 500 of the fifth embodiment, the number of detection points is increased by one compared with the coordinate detector 100 of the first embodiment. Therefore, in such a case where it is difficult to detect a subtle change in position by detection at two points, it is possible to perform coordinate detection with more accuracy because of an increase in detection points.

Sixth Embodiment

Figure 7:
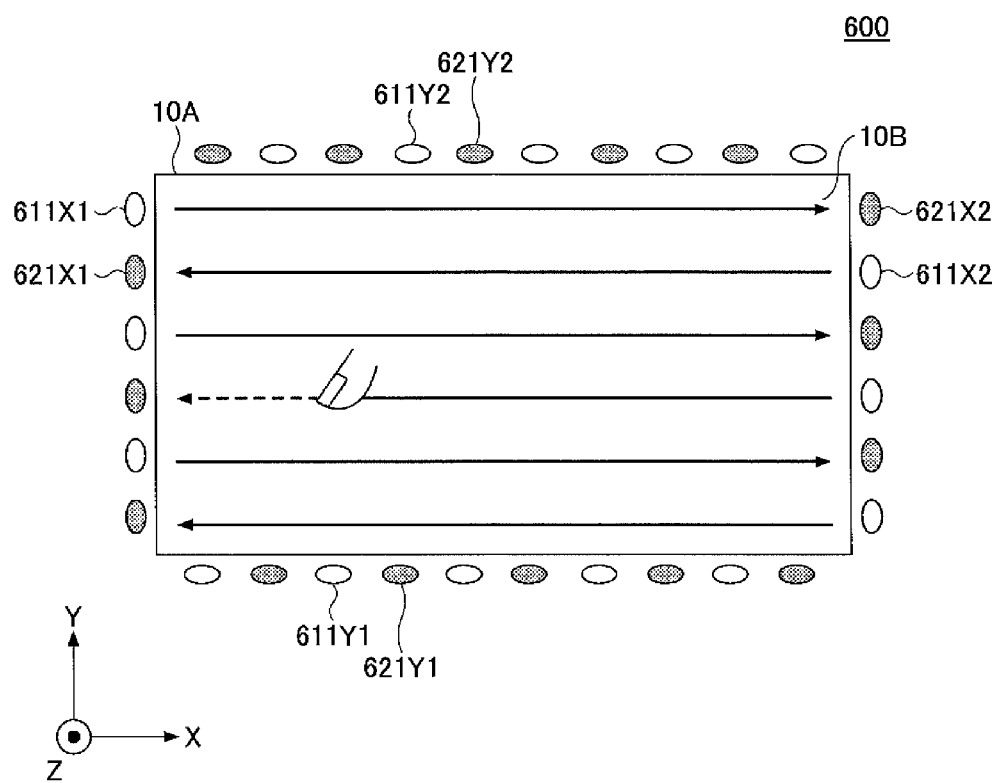
FIG. 7 is a diagram illustrating a configuration of a coordinate detector according to a sixth embodiment.

FIG. 7 is a diagram illustrating a configuration of a coordinate detector 600 according to a sixth embodiment. In the following description of the sixth embodiment, the same elements as those of the first through fifth embodiments are referred to by the same reference numerals, and their description is omitted.

According to the coordinate detector 600 of the sixth embodiment, the exit lenses 111X and 111Y and the entrance lenses 121X and 121Y of the coordinate detector 100 of the first embodiment are alternately arranged, respectively.

The coordinate detector 600 includes exit lenses 611X1, 611X2, 611Y1, and 611Y2 and entrance lenses 621X1, 621X2, 621Y1, and 621Y2.

As illustrated in FIG. 7, the exit lenses 611X1, 611X2, 611Y1, and 611Y2 and the entrance lenses 621X1, 621X2, 621Y1, and 621Y2 may be arranged so that light propagates alternately in first and second opposite directions relative to each of the x-axis direction and the y-axis direction.

Seventh Embodiment

Figure 8:
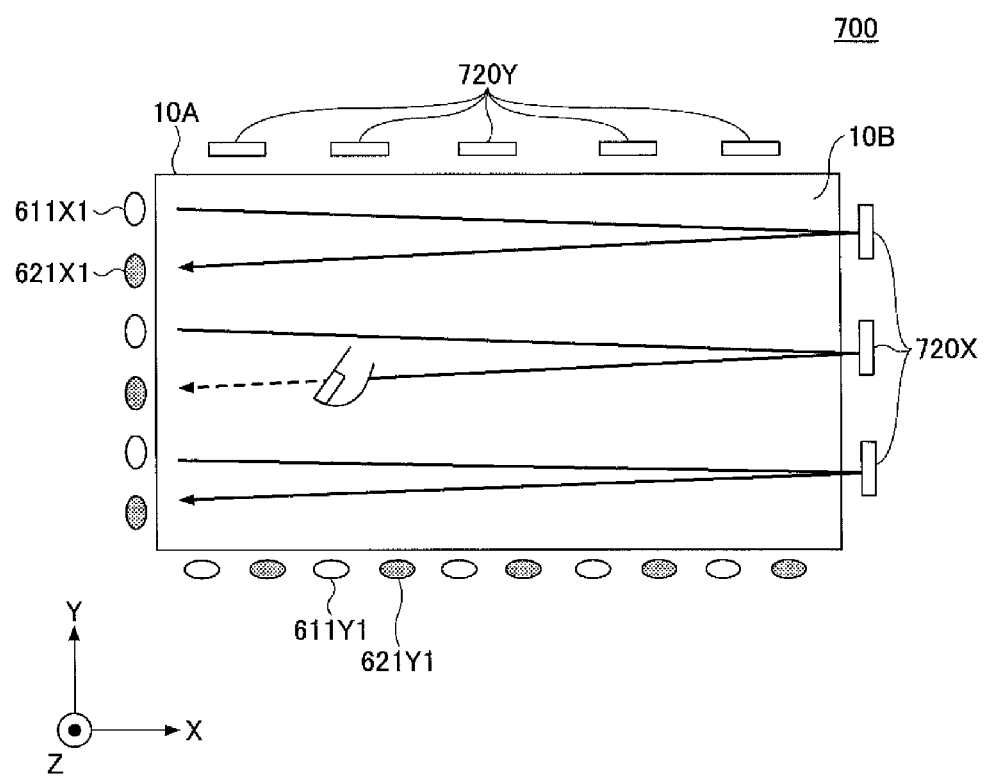
FIG. 8 is a diagram illustrating a configuration of a coordinate detector according to a seventh embodiment.

FIG. 8 is a diagram illustrating a configuration of a coordinate detector 700 according to a seventh embodiment. In the following description of the seventh embodiment, the same elements as those of the first through sixth embodiments are referred to by the same reference numerals, and their description is omitted.

The coordinate detector 700 of the seventh embodiment includes mirrors 720X and 720Y, instead of the exit lenses 611X2 and 611Y2 and the entrance lenses 621X2 and 621Y2 of the coordinate detector 600 of the sixth embodiment.

Therefore, light exiting from the exit lens 611X1 is reflected by one of the mirrors 720X to enter the entrance lens 621X1, so as to be detected by light-receiving element like the light-receiving element 140X of the first embodiment. Furthermore, light exiting from the exit lens 611Y1 is reflected by one of the mirrors 720Y to enter the entrance lens 621Y1, so as to be detected by light-receiving element.

Such use of the mirrors 720X and 720Y is suitable in the case where light widens to some extent during its propagation, and is extremely effective in the case where light paths exist between the exit lenses 611X1 and the entrance lenses 621X1 by way of the mirrors 720X and light paths exits between the exit lenses 611Y1 and the entrance lenses 621Y1 by way of the mirrors 720Y as indicated by bold solid arrows in FIG. 8.

Eighth Embodiment

Figure 9:
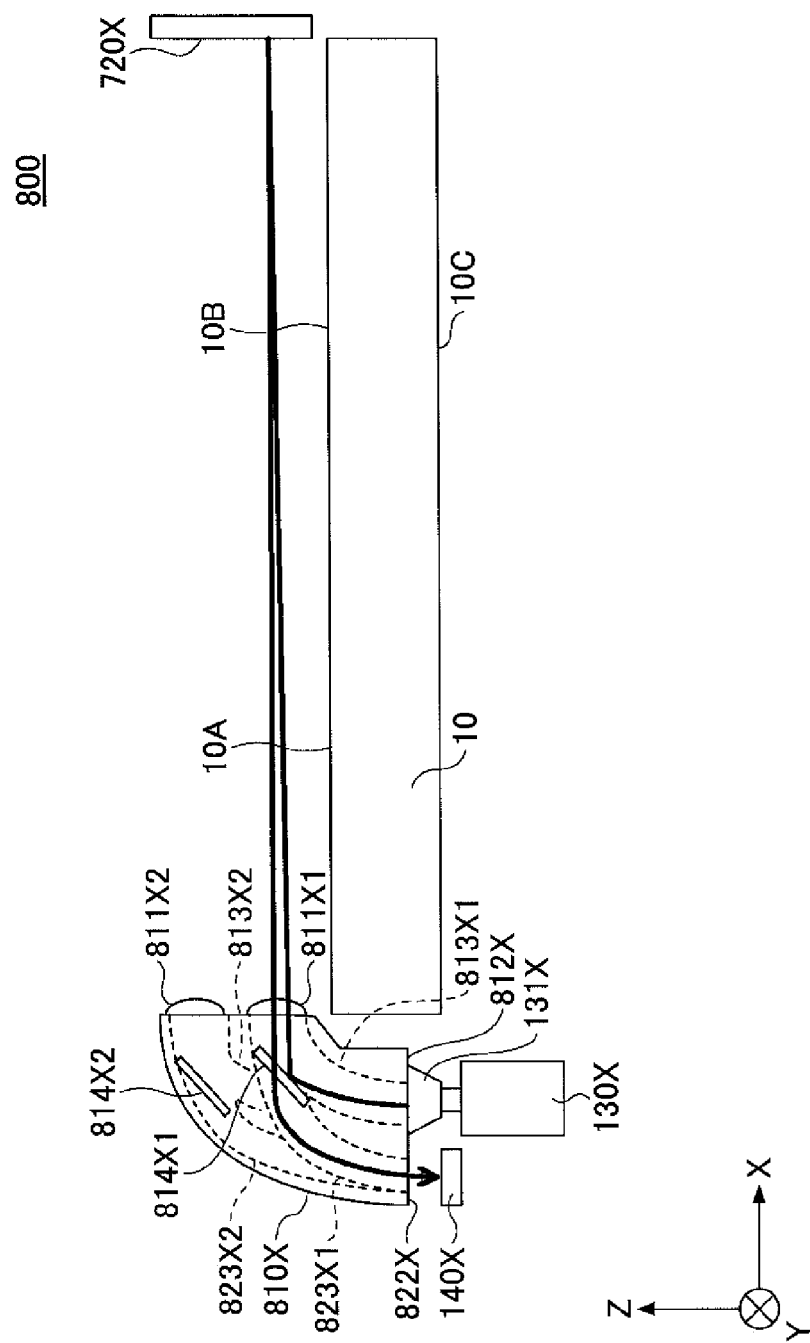
FIG. 9 is a diagram illustrating a configuration of a coordinate detector according to an eighth embodiment.

FIG. 9 is a diagram illustrating a configuration of a coordinate detector 800 according to an eighth embodiment. In the following description of the eighth embodiment, the same elements as those of the first through seventh embodiments are referred to by the same reference numerals, and their description is omitted.

The coordinate detector 800 includes a light guide 810X, the light sources 130X, the light-receiving elements 140X, and the mirrors 720X.

The light guide 810X includes exit and entrance lenses 811X1, 811X2, entrance ends 812X, waveguides 813X1, 813X2, 823X1, and 823X2, half mirrors 814X1, 814X2, and exit ends 822X.

The exit and entrance lenses 811X1 and 811X2 are lenses where light exits from and enters the light guide 810X. Referring to FIG. 9, the exit and entrance lenses 811X1 communicates with one ends of the waveguides 813X1 and 823X1. The exit and entrance lens 811X2 communicates with one ends of the waveguides 813X2 and 823X2.

Each of the entrance ends 812X, which faces the output part 131X of the corresponding light source 130X, is an end part that light emitted from the light source 130X enters.

The waveguides 813X1 extends between and connects the exit and entrance lens 811X1 and the corresponding entrance end 812X. The waveguides 823X1 extends between and connects the exit and entrance lens 811X1 and the corresponding exit end 822X. The waveguides 813X1 and 823X1 overlap (merge) with each other on the exit and entrance lens 811X1 side of the half mirror 814X1.

The waveguide 813X2 is positioned adjacent to the waveguide 813X1 on the side of the waveguide 813X1 in the positive y-axis direction. The waveguide 813X2 extends between and connects the exit and entrance lens 811X2 and the corresponding entrance end 812X which is positioned adjacent to the entrance end 812X illustrated in FIG. 9 in the positive y-axis direction. The waveguides 823X2 extends between and connects the exit and entrance lens 811X2 and the corresponding exit end 822X which is positioned adjacent to the exit end 822X illustrated in FIG. 9 in the positive y-axis direction. The waveguides 813X2 and 823X2 overlap (merge) with each other on the exit and entrance lens 811X2 side of the half mirror 814X2.

The half mirror 814X1 is a half mirror that totally reflects light entering the waveguide 813X1 emitted from the corresponding light source 130X to the exit and entrance lens 811X1, and transmits the light entering the waveguide 823X1 through the exit and entrance lens 811X1, as indicated by a bold solid arrow in FIG. 9.

Therefore, light that emitted from the light source 130X and enters the corresponding waveguide 813X1 is totally reflected by the half mirror 814X1 to exit from the exit and entrance lens 811X1, and is reflected by the corresponding mirror 720X to enter the exit and entrance lens 811X1. Then, the light enters the waveguide 823X1 to be transmitted through the half mirror 814X1, and propagates through the waveguide 823X1 to exit from the corresponding exit end 822X and enter the corresponding light-receiving element 140X.

Likewise, the half mirror 814X2 totally reflects light entering the waveguide 813X2 from the corresponding light source 130X (positioned adjacent to the light source 130X illustrated in FIG. 9 in the positive y-axis direction) to the exit and entrance lens 811X2, and transmits the light entering the waveguide 823X2 through the exit and entrance lens 811X2.

Therefore, light that enters the waveguide 813X2 from the corresponding light source 130X is totally reflected by the half mirror 814X2 to exit from the exit and entrance lens 811X2, and is reflected by the corresponding mirror 720X to enter the exit and entrance lens 811X2. Then, the light enters the waveguide 823X2 to be transmitted through the half mirror 814X2, and propagates through the waveguide 823X2 to exit from the corresponding exit end 822X and enter the corresponding light-receiving element 140X.

The above-described configurations and light paths are equally applied with respect to the y-axis direction.

Thus, according to the eighth embodiment, it is possible to provide the coordinate detector 800, where light paths are provided one over another over the surface 10B of the LCD 10 using the mirrors 720X.

Ninth Embodiment

FIGS. 10A and 10B are diagrams illustrating a configuration of a coordinate detector 900 according to a ninth embodiment. FIG. 10A is a plan view of a touchscreen panel according to this embodiment. FIG. 10B is a diagram illustrating a cross section of the touchscreen panel viewed in a direction indicated by arrows C in FIG. 10A. FIGS. 10A and 10B illustrate part of the coordinate detector 900 associated with position detection in the y-axis direction.

The coordinate detector 900 is attached to the LCD 10.

The coordinate detector 900 includes the light guides 210X and 220X, the light sources 230X1 and 230X2, the light-receiving elements 240X1 and 240X2, and mirrors 920X1 and 920X2. In FIGS. 10A and 10B, the illustration of the control part 150 is omitted. Like in the first embodiment, however, the control part 150 is connected to the light sources 230X1 and 230X2 and to the light-receiving elements 240X1 and 240X2, and performs position detection by performing the same control as in the first embodiment.

The light guides 210X and 220X, the light sources 230X1 and 230X2, and the light-receiving elements 240X1 and 240X2 are the same as those of the second embodiment (FIG. 3), but are configured to receive light by way of the mirrors 920X1 and 920X2.

The coordinate detector 900 of the ninth embodiment is a combination of the coordinate detector 200 of the second embodiment and the mirrors 920X1 and 920X2 which are included in light paths for coordinate detection.

Referring to FIG. 10A, light that exits from the first exit lens 211X2 from the negative y-axis direction is reflected alternately by the mirrors 920X2 and 920X1 in this order to enter the first entrance lens 221X2 from the positive y-axis direction.

Such a light path is an example, and according to the ninth embodiment, it is possible to improve detection accuracy by increasing the number of light paths for coordinate detection by adding the mirrors 920X1 and 920X2 to the coordinate detector 200 of the second embodiment.

Furthermore, use of the mirrors 920X1 and 920X2 makes it possible to achieve an arrangement where the number of the entrance lenses 221X1 and 221X2 and the number of the exit lenses 211X1 and 211X2 are reduced.

Tenth Embodiment

Figure 11:
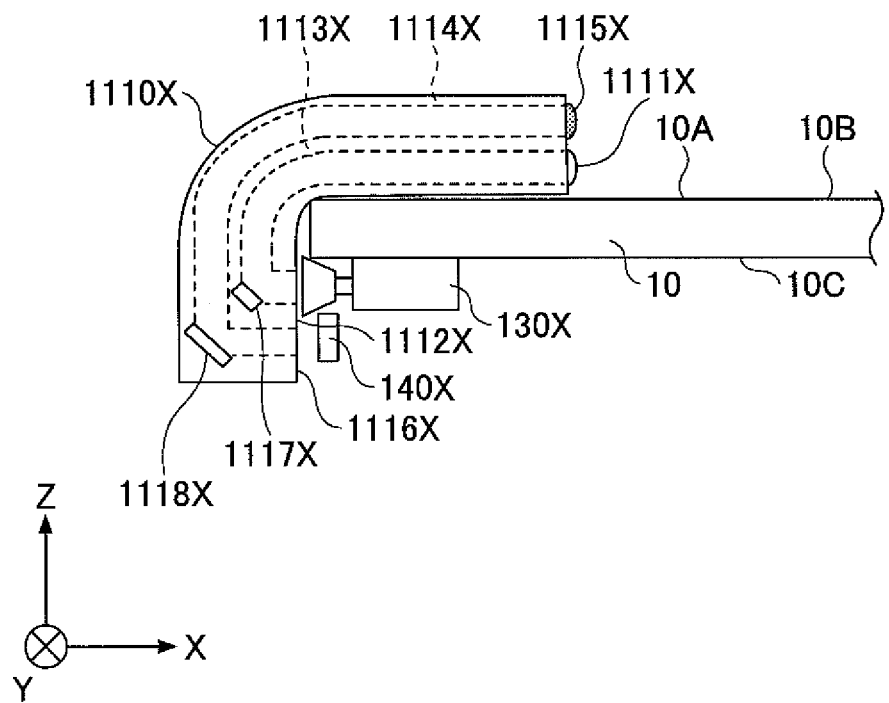
FIG. 11 is a diagram illustrating a configuration of a light guide according to a tenth embodiment.

FIG. 11 is a diagram illustrating a configuration of a light guide 1110X according to a tenth embodiment.

The light guide 1110X includes exit lenses 1111X, entrance ends 1112X, waveguides 1113X and 1114X, entrance lenses 1115X, exit ends 1116X, mirrors 1117X and 1118X, light sources 130X, and light-receiving elements 140X.

Referring to FIG. 11, the exit lens 1111X is provided on the exit end side of the waveguide 1113X. The entrance end 1112X of the waveguide 1113X is positioned on the side of the lower surface 10C of the LCD 10 in the negative z-axis direction.

The waveguide 1113X illustrated in FIG. 11 has the shape similar to that of the waveguides 213X1 and 213X2 of the second embodiment, but is elongated in the negative z-axis direction and then bent in the positive x-axis direction. Thus, the waveguide 1113X has a cross-sectional shape of an angular letter C. The mirror 1117X is provided between the exit lens 1111X and the entrance ends 1112X in the waveguide 1113X. The mirror 1117X may be formed together with the light guide 1110X by molding or the like when the light guide 1110X is formed using an FPC.

The waveguide 1114X is similar in shape to the waveguide 1113X. The entrance lens 1115X is formed on the entrance end side of the waveguide 1114X. The mirror 1118X is provided between the entrance lens 1115X and the exit end 1116X in the waveguide 1114X.

Light emitted from the light source 130X enters the light guide 1110X through the entrance end 1112X so as to be reflected in the positive z-axis direction by the mirror 1116X in the waveguide 1113X. Then, the light exits from the exit lens 1111X on the exit end side to propagate in the positive x-axis direction.

The light reflected by a mirror provided at the other side of the coordinate detector (not illustrated) propagates in the negative x-axis direction to enter the waveguide 1114X through the entrance lens 1115X. Then, the light is reflected in the negative z-axis direction by the mirror 1118X and exits from the exit end 1116X to be received by the light-receiving element 140X.

The materials of the parts of the light guide 1110X are the same as those of the parts of the light guides 110X and 210X of the first and the second embodiment.

The above-described configuration and light path are equally applied with respect to the y-axis direction.

Thus, according to the tenth embodiment, the light sources 130X and the light-receiving elements 140X may be provided on the lower surface 10C of the LCD 10. Furthermore, by providing the light sources 130X and the light-receiving elements 140X on the lower surface 10C of the LCD 10, it is possible to reduce the length of a coordinate detector in the x-axis direction compared with the case of arranging the light sources 130X and the light-receiving elements 140X outside the ends of the LCD 10 in the positive x-axis direction and in the negative x-axis direction as in the first and the second embodiment.

Eleventh Embodiment

Figure 12:
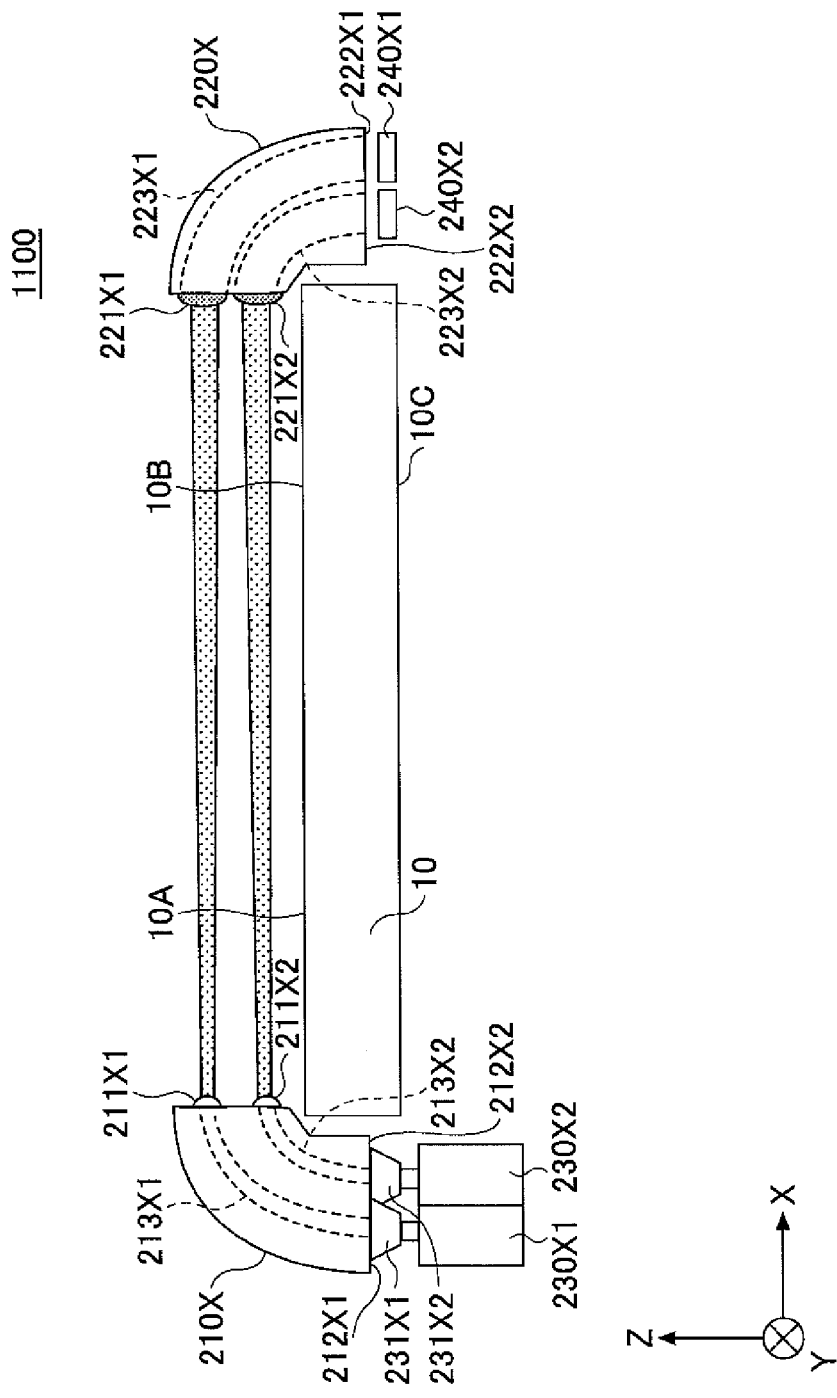
FIG. 12 is a diagram illustrating a configuration of a coordinate detector according to an eleventh embodiment.

FIG. 12 is a diagram illustrating a configuration of a coordinate detector 1100 according to an eleventh embodiment.

The coordinate detector 1100 is the coordinate detector 200 of the second embodiment with the enlarged entrance lenses 221X1 and 221X2. Therefore, the coordinate detector 1100 is described below using the same reference numerals as in the second embodiment.

Diameters of the entrance lenses 221X1 and 221X2 are larger than diameters of the exit lenses 211X1 and 211X2. In this case, the term "larger" means being larger in size in the y-axis direction and the z-axis direction in FIG. 12. The entrance lenses 221X1 and 221X2 may also be larger in the x-axis direction (lens thickness).

By thus enlarging the entrance lenses 221X1 and 221X2, even when light exiting from the exit lenses 211X1 and 211X2 widens during its propagation, it is possible to cause the light to enter the entrance lenses 221X1 and 221X2, so that it is possible to ensure the amount of light received at the light-receiving elements 140X. Therefore, even in the case where light widens during its propagation, it is possible to improve the accuracy of detection.

Twelfth Embodiment

Figure 13:
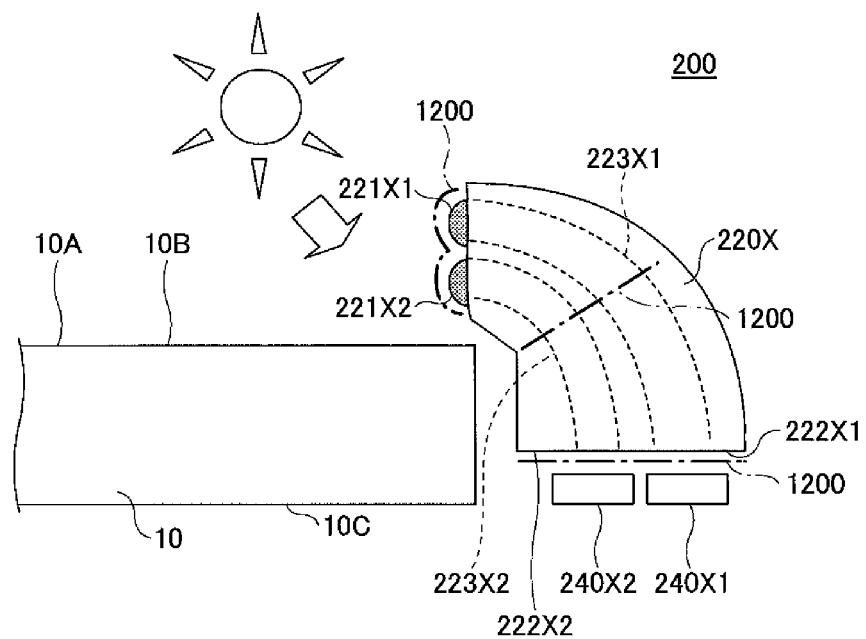
FIG. 13 is a diagram illustrating a light guide according to a twelfth embodiment.

FIG. 13 is a diagram illustrating a light guide according to a twelfth embodiment.

According to the twelfth embodiment, a filter is added to the light guide 220X of the second embodiment (FIG. 3). Accordingly, the light guide 220X and its surroundings are extracted from FIG. 3 and illustrated in FIG. 13. The twelfth embodiment is described using the same reference numerals as in the second embodiment.

Referring to FIG. 13, a filter 1200 is provided on the entrance side of the entrance lenses 221X1 and 221X2, on the exit side of the entrance ends 222X1 and 222X2, or in the middle of the waveguides 223X1 and 223X2.

According to the twelfth embodiment, the coordinate detector 100 which performs coordinate detection using light may be used under sunlight when the coordinate detector 100 is provided outdoors, for example. In such a case, if sunlight or ambient light may affect the detection of light at the coordinate detector 100, it is effective to use the filter 1200.

For example, when the filter 1200 is provided on the entrance side of the entrance lenses 221X1 and 221X2, by properly presetting wavelengths to be blocked by the filter 1200, it is possible to select the wavelength of light that enters the light guide 220X, so that light of a wavelength desired for detection at the light-receiving elements 240X1 and 240X2 alone may be transmitted.

This also applies to the case of providing the filter 1200 in the middle of the waveguides 223X1 and 223X2 and the case of providing the filter 1200 on the exit side of the exit ends 222X1 and 222X2.

Thus, according to the twelfth embodiment, when sunlight or ambient light is likely to affect the detection of light, it is possible to improve the accuracy of detection by providing the light guide 220X with the filter 1200. The same applies to detection in the x-axis direction.

Thirteenth Embodiment

Figure 14:
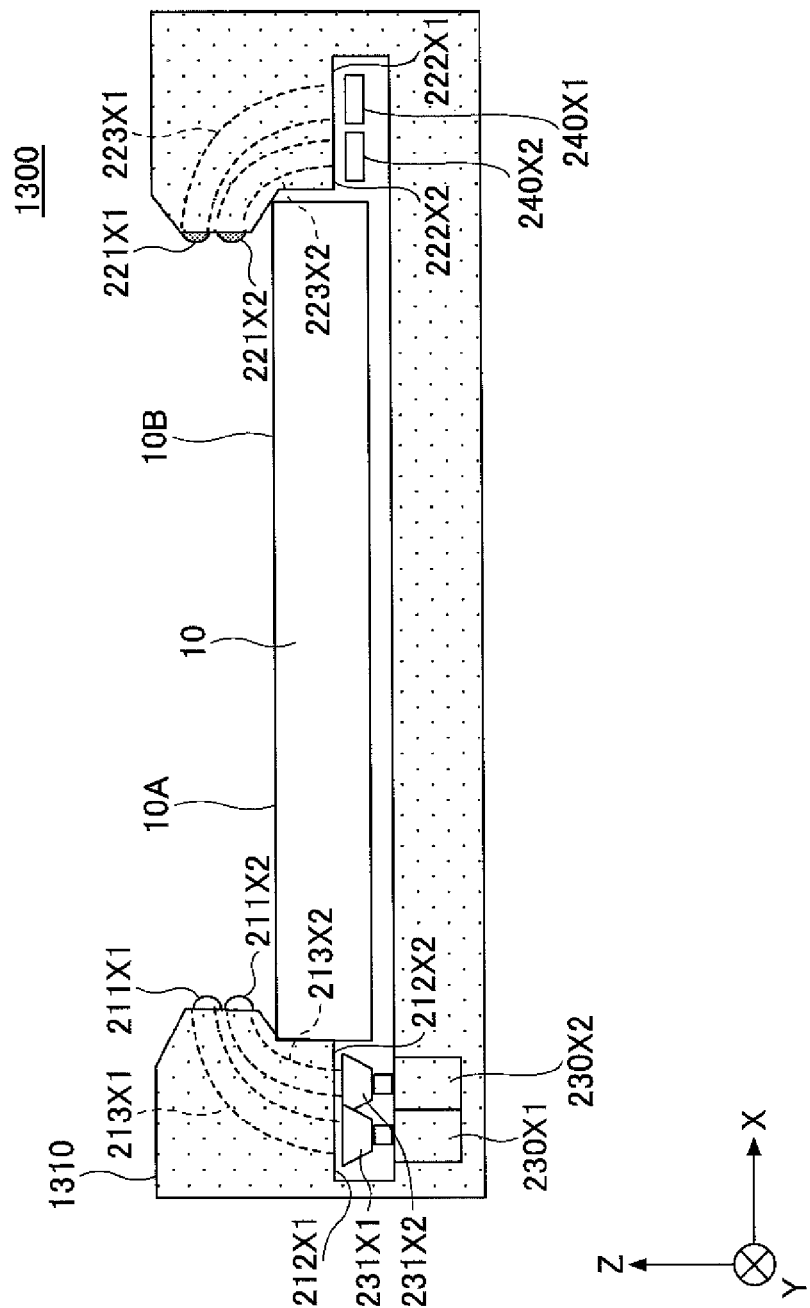
FIG. 14 is a diagram illustrating a configuration of a coordinate detector according to a thirteenth embodiment.

FIG. 14 is a diagram illustrating a configuration of a coordinate detector 1300 according to a thirteenth embodiment. According to the coordinate detector 1300 of the thirteenth embodiment, light guides and a housing that protects the LCD 10 are unitarily formed.

The coordinate detector 1300 includes a housing 1310, the light sources 230X1 and 230X2, and the light-receiving elements 240X1 and 240X2. In FIG. 14, the illustration of the control part 150 is omitted. Like in the first embodiment, however, the control part 150 is connected to the light sources 230X1 and 230X2 and to the light-receiving elements 240X1 and 240X2, and performs position detection by performing the same control as in the first embodiment.

As illustrated in FIG. 14, the housing 1310 includes the exit lenses 211X1 and 211X2, the entrance ends 212X1 and 212X2, and the waveguides 213X1 and 213X2 in the negative x-axis direction. The exit lenses 211X1 and 211X2, the entrance ends 212X1 and 212X2, and the waveguides 213X1 and 213X2 are the same as those of the second embodiment.

Furthermore, the housing 1310 includes the entrance lenses 221X1 and 221X2, the exit ends 222X1 and 222X2, and the waveguides 223X1 and 223X2 on the side in the positive x-axis direction. The entrance lenses 221X1 and 221X2, the exit ends 222X1 and 222X2, and the waveguides 223X1 and 223X2 are the same as those of the second embodiment.

The light guides 210X and 220X may be unitarily formed with and built in the housing 1310 of FIG. 14.

Fourteenth Embodiment

In a fourteenth embodiment, the results of checking the intensity of light that enters the light guide 120Y through the entrance lenses 121Y and is received by the light-receiving elements 140Y in the coordinate detector 100 described in the first embodiment are described. The fourteenth embodiment is described using the same reference numerals as for the coordinate detector 100 of the first embodiment 1.

FIGS. 15A and 15B, FIGS. 16A, 16B and 16C, and FIGS. 17A, 17B and 17C are diagrams illustrating light amount data in the fourteenth embodiment. In FIGS. 15A through 17C, the ten entrance lenses 121Y are described with respective numbers of one to ten from the side in the negative x-axis direction side to the side in the positive x-axis direction.

Furthermore, in the case of coordinate detection, light exits sequentially from the ten exit lenses 111Y in order. FIGS. 15A through 17C illustrate a distribution of light exiting from all ten exit lenses 111Y.

Figure 15A:
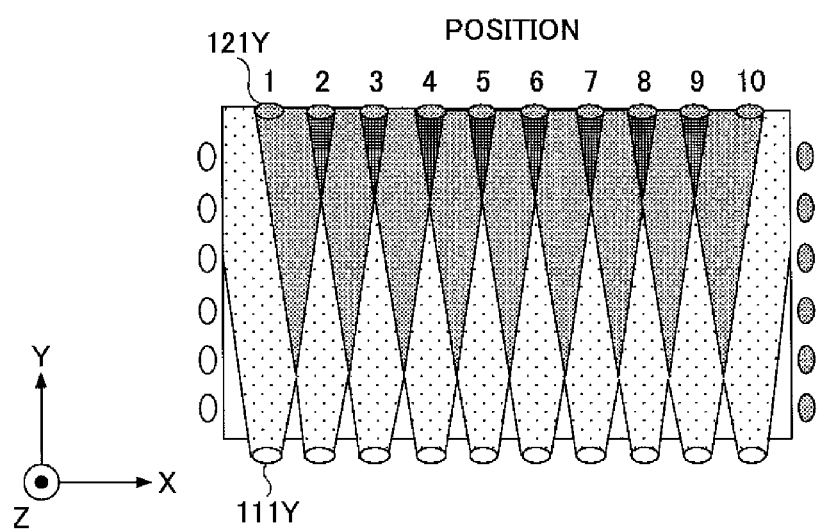
FIGS. 15A and 15B are diagrams illustrating light amount data according to a fourteenth embodiment.
Figure 16A:
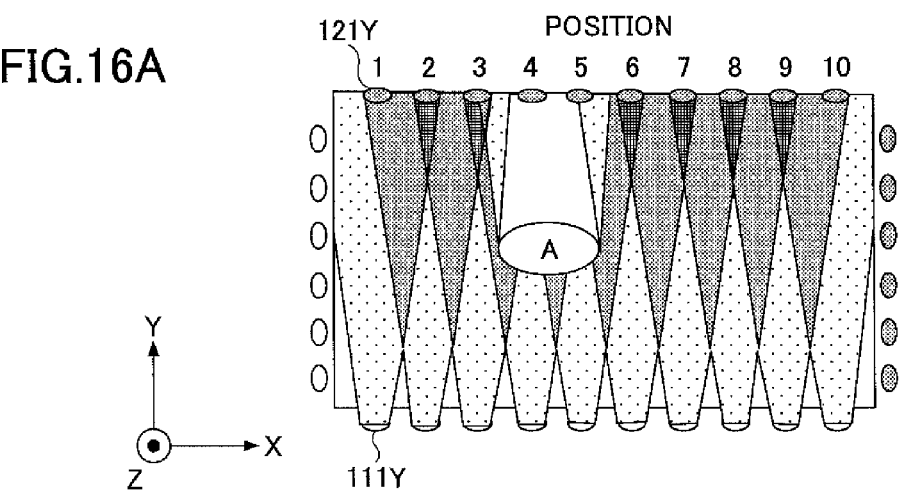
FIGS. 16A, 16B and 16C are diagrams illustrating light amount data according to the fourteenth embodiment.
Figure 17A:
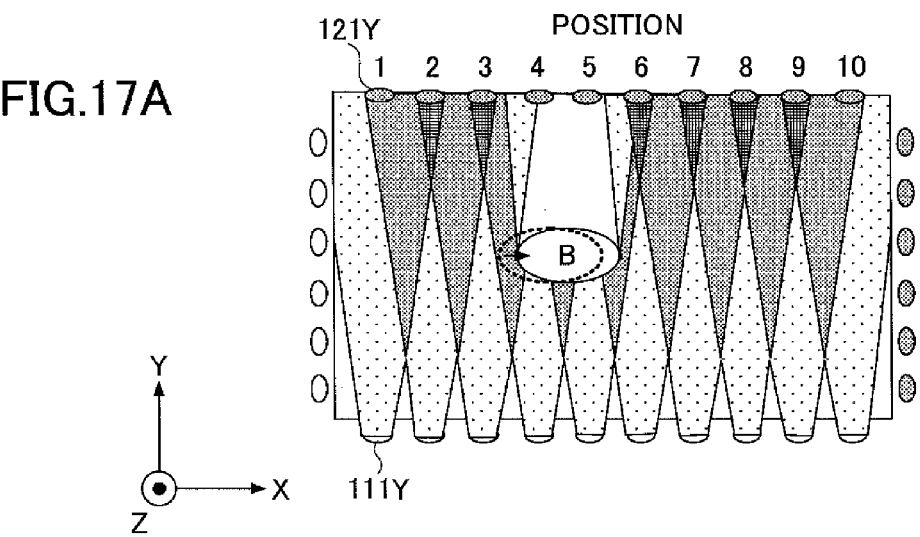
FIGS. 17A, 17B and 17C are diagrams illustrating light amount data according to the fourteenth embodiment.

In FIGS. 15A, 16A and 17A, the distribution is illustrated with four grayscale levels, where the amount of light is larger in a darker part and is lowest in a white part (a level equivalent to no amount of light).

Figure 15B:
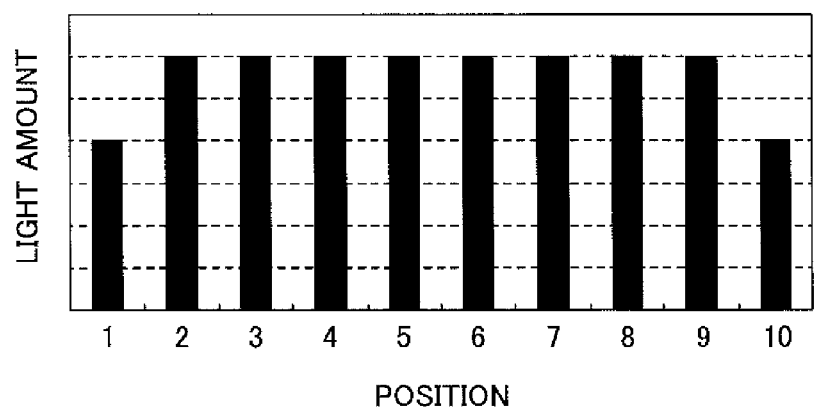
Figure 16B:
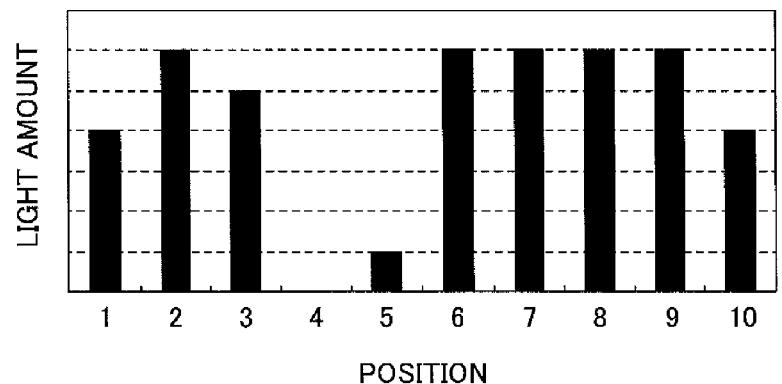
Figure 17B:
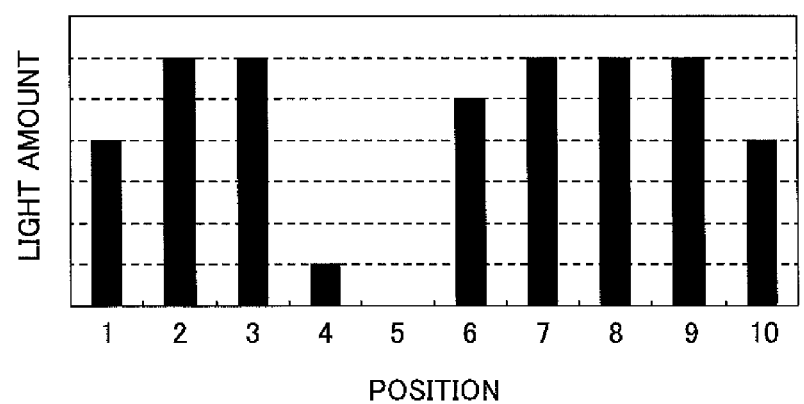

FIGS. 15B, 16B and 17B illustrate the intensity of light (the amount of light) entering the light guide 120Y through each of the entrance lenses 121Y #1 through #10 and received by the corresponding light-receiving element 140Y.

Figure 16C:
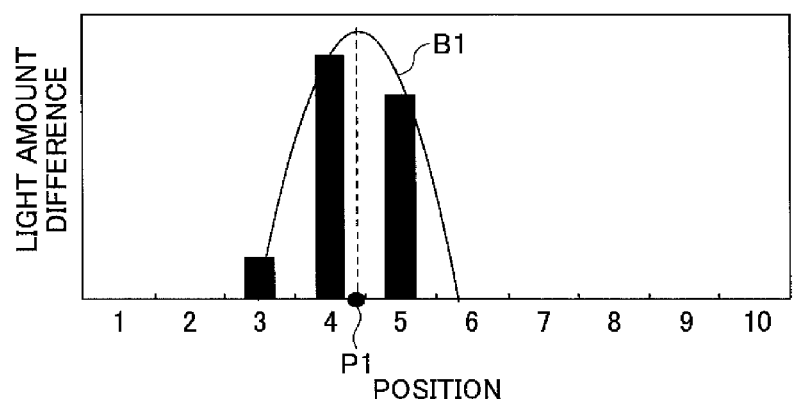
Figure 17C:
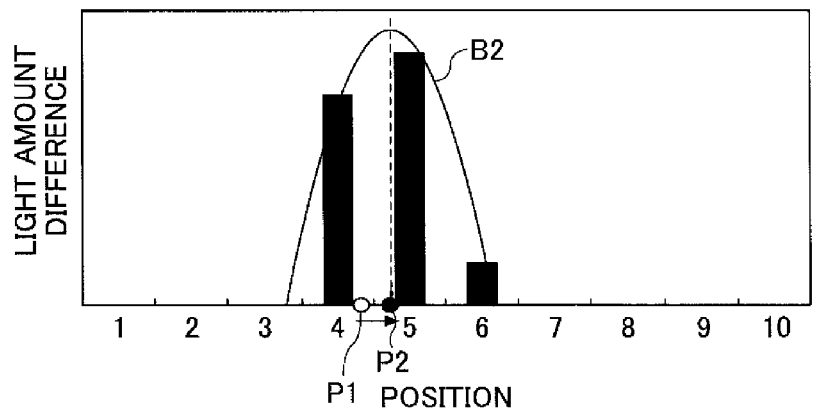

FIGS. 16C and 17C illustrate changes in the amount of light entering the light guide 120Y through the entrance lenses 121Y #1 through #10 and received by the light-receiving elements 140Y. These changes are differences between the amount of light in a state where there is no operation input and the amount of light in a state where there is an operation input.

The amount of light that exits from the ten exit lenses 111Y as illustrated in FIG. 15A and is received by the light-receiving elements 140Y through the corresponding entrance lenses 121Y is the same with respect to the entrance lenses 121Y #2 through #9 and is slightly smaller with respect to the entrance lenses 121Y #1 and #10 at both ends than with respect to the entrance lenses 121Y #2 through #9 as illustrated in FIG. 15B. FIG. 15A illustrates a distribution of the amount of light in a state where there is no operation input.

When there is an operation input at Position A, which is over the entrance lenses 121Y #4 and #5 as illustrated in FIG. 16A, the amount of light received through the entrance lens 121Y #3 is reduced to 5/6, the amount of light received through the entrance lens 121Y #4 is reduced to substantially zero, and the amount of light received through the entrance lens 121Y #5 is reduced to approximately 1/6 as illustrated in FIG. 16B. As a result, the changes are 1/6 for the amount of light received through the entrance lens 121Y #3, 6/6 for the amount of light received through the entrance lens 121Y #4, and 5/6 for the amount of light received through the entrance lens 121Y #5 as illustrated in FIG. 16C. Therefore, when a curve B1 fitted to the distribution of the three changes in the amount of light is constructed, the input coordinate is a point P1 between #4 and #5, where the peak of the fitted curve B1 is located.

Furthermore, when the position of the operation input changes from Position A that is over the entrance lenses 121Y #4 and #5 to Position B slightly shifted to the side of the entrance lens 121Y #5 (the side in the positive x-axis direction) as illustrated in FIG. 17A, the amount of light received through the entrance lens 121Y #3 increases to 6/6, the amount of light received through the entrance lens 121Y #4 increases to 1/6, the amount of light received through the entrance lens 121Y #5 is reduced to substantially zero, and the amount of light received through the entrance lens 121Y #6 is reduced to 5/6 as illustrated in FIG. 17B. As a result, the changes are 5/6 for the amount of light received through the entrance lens 121Y #4, 6/6 for the amount of light received through the entrance lens 121Y #5, and 1/6 for the amount of light received through the entrance lens 1211 #6 as illustrated in FIG. 17C. Therefore, when a curve B2 fitted to the distribution of the three changes in the amount of light is constructed, the input coordinate is a point P2 between #4 and #5, where the peak of the fitted curve B2 is located.

According to the fourteenth embodiment, it is possible to detect the position in the x-axis direction of an operation input in the above-described manner in the coordinate detector 100. The same applies to position detection in the y-axis direction.

Fifteenth Embodiment

Figure 18:
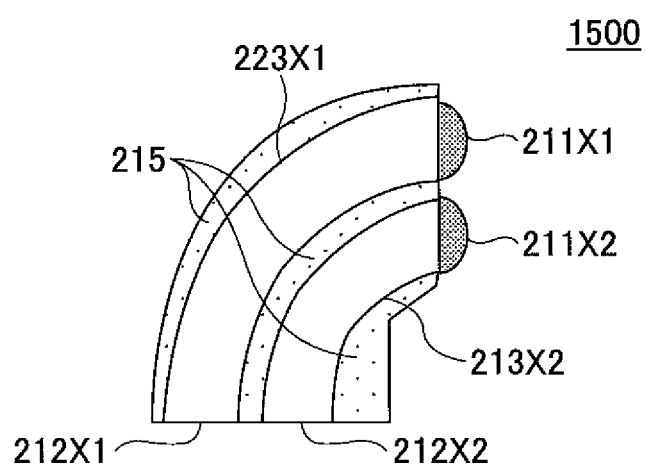
FIG. 18 is a cross-sectional view of a light guide according to a fifteenth embodiment.

FIG. 18 is a cross-sectional view of a light guide 1500 according to a fifteenth embodiment.

The light guide 1500 has a configuration similar to the light guides 210X and 210Y of the second embodiment. Accordingly, the light guide 1500 is described using the same reference numerals as those of the elements of the light guide 210X.

The light guide 1500 includes the exit lenses 211X1 and 211X2, the entrance ends 212X1 and 212X2, and the waveguides 213X1 and 213X2.

With respect to the refractive indexes of the exit lenses 211X1 and 211X2, the waveguides 213X1 and 213X2, and a part 215 outside the waveguides 213X1 and 213X2, a refractive index R2 of the waveguides 213X1 and 213X2 needs to be higher than a refractive index R1 of the outside part 215 (R1<R2), while there is no particular magnitude relationship between a refractive index R3 of the exit lenses 211X1 and 211X2 and the refractive indexes R1 and R2.

By setting the refractive index R2 higher than the refractive index R1, it is possible to guide light with the waveguides 213X1 and 213X2.

FIG. 19 is a diagram illustrating an arrangement of the exit lenses 111X and 111Y and the entrance lenses 121X and 121Y in the coordinate detector 100 according to the fifteenth embodiment. According to the fifteenth embodiment, the pitch between adjacent exit lenses 111X and 111Y and the pitch between adjacent entrance lenses 121X and 121Y are less than or equal to 15 mm. By setting the pitch to approximately this size, it is possible to detect coordinates with accuracy when a user performs an operation with a finger.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples and conditions in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A coordinate detector for detecting an input operation over a first surface of a display part, the display part including a second surface facing away from the first surface, the coordinate detector comprising:

a light output part configured to emit light, wherein the light output part is provided in an area around the display part on a side closer to the second surface than to the first surface;

a light detection part configured to output a detection signal according to an amount of light that enters the light detection part, wherein the light detection part is provided in the area around the display part on the side closer to the second surface than to the first surface;

a first guide part configured to guide light emitted from the light output part toward a direction along the first surface, wherein the first guide part is positioned on a side closer to the first surface than is the light output part; and a second guide part configured to guide, toward the light detection part, light exiting from the first guide part and passing along and over the first surface of the display part, wherein the second guide part is positioned on a side closer to the first surface than is the light detection part, wherein a position of the input operation over the first surface is detected based on the detection signal output by the light detection part.

2. The coordinate detector as claimed in claim 1, wherein the first guide part includes an exit lens from which light guided by the first guide part exits, and the second guide part includes an entrance lens that light passing over the first surface enters.

3. The coordinate detector as claimed in claim 2, wherein each of the exit lens and the entrance lens has a diameter longer in a first direction in which the first surface faces away from the second surface than in a second direction perpendicular to the first direction.

4. The coordinate detector as claimed in claim 2, wherein the entrance lens has a size greater than a size of the exit lens.

5. The coordinate detector as claimed in claim 2, wherein a size of the entrance lens is greater than a size of the exit lens in the second direction.

6. The coordinate detector as claimed in claim 1, further comprising:

a reflection part configured to reflect, toward the second guide part, light exiting from the first guide part and passing along and over the first surface to be incident on the reflection part, wherein the reflection part is provided along a third part of the periphery of the display part and is included in a light path between the first guide part and the second guide part.

7. The coordinate detector as claimed in claim 6, wherein the first guide part and the second guide part are unitarily formed as a guide part, and the unitarily formed guide part includes a first waveguide configured to guide light output by the light output part along the first surface;

a second waveguide configured to guide the light reflected by the reflection part to the light detection part;

a lens which the light guided by the first waveguide is output from and the light reflected by the reflection part enters; and a half mirror provided in a light path which the light output from the light output part and the light entering through the lens pass through, wherein the half mirror is configured to reflect the light output from the light output part and transmit the light entering through the lens.

8. The coordinate detector as claimed in claim 1, wherein the light output part includes a plurality of light output portions configured to output respective lights, the light detection part includes a plurality of light detection portions, the first guide part includes a plurality of first waveguides each corresponding to one of the light output portions, and separately guiding light output by the corresponding light output portion toward the direction along the first surface; and the second guide part includes a plurality of second waveguides each corresponding to one of the light detection portions, and separately guiding light passing over the first surface and entering from one end thereof to the corresponding light detection portion, and the light detection portions are configured to output respective detection signals separately.

9. The coordinate detector as claimed in claim 1, including:
a first optical detection system and a second optical detection system, each including the light output part, the first guide part, the second guide part, and the light detection part,
wherein a direction of the light passing over the first surface and entering the first optical system and a direction of the light passing over the first surface and entering the second optical system are different in a plan view.

10. The coordinate detector as claimed in claim 1, further comprising:
a housing configured to hold the light output part and the light detection part,
wherein the first guide part and the second guide part are unitarily formed with the housing.

* * * * *